(12) United States Patent
Khoshnevisan et al.

(10) Patent No.: US 11,690,022 B2
(45) Date of Patent: Jun. 27, 2023

(54) MANAGING TRANSMIT POWER CONTROL

(71) Applicant: QUALCOMM incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 17/188,589

(22) Filed: Mar. 1, 2021

(65) Prior Publication Data
US 2021/0306958 A1 Sep. 30, 2021

Related U.S. Application Data

(60) Provisional application No. 62/994,232, filed on Mar. 24, 2020.

(51) Int. Cl.
*H04W 52/08* (2009.01)
*H04W 52/24* (2009.01)

(52) U.S. Cl.
CPC ................. *H04W 52/242* (2013.01)

(58) Field of Classification Search
CPC ....... H04W 84/18; H04W 4/40; H04W 92/18; H04W 16/28; H04W 52/08; H04W 48/20; H04W 52/10; H04W 52/04
See application file for complete search history.

(56) References Cited

U.S. PATENT DOCUMENTS

| | | | |
|---|---|---|---|
| 2013/0242854 A1 | 9/2013 | Cai et al. | |
| 2015/0018031 A1* | 1/2015 | Yamazaki | H04W 52/242 455/522 |
| 2019/0053080 A1* | 2/2019 | Ryu | H04W 24/08 |
| 2020/0059871 A1* | 2/2020 | Ryu | H04W 72/04 |
| 2020/0205156 A1* | 6/2020 | Adjakple | H04W 72/0453 |
| 2020/0221405 A1* | 7/2020 | Zarifi | H04W 36/0085 |

(Continued)

OTHER PUBLICATIONS

International Search Report and Written Opinion—PCT/US2021/020568—ISA/EPO—dated Jul. 26, 2021. 30 pages.

(Continued)

*Primary Examiner* — Tu X Nguyen
(74) *Attorney, Agent, or Firm* — The Marbury Law Group, PLLC

(57) ABSTRACT

This disclosure provides systems, methods and apparatus, including computer programs encoded on computer storage media, for managing transmit power control. In one aspect, a wireless device may receive a message including a path loss value and may transmit a signal to a UL Rx point using an uplink transmit power associated with the received path loss value. In another aspect, a wireless device may receive a reference signal, and a message including an offset value, and may transmit a signal to a UL Rx point using an uplink transmit power including a downlink path loss value associated with the reference signal minus the offset value. In another aspect, a base station may obtain a power measurement of a signal from a wireless device and may send to the wireless device a path loss value associated with the received power measurement, or an offset value associated with the received power measurement.

26 Claims, 20 Drawing Sheets

(56) References Cited

U.S. PATENT DOCUMENTS

2020/0229193 A1* 7/2020 Abiri .................. H04W 28/08
2021/0212105 A1* 7/2021 Takeda ................ H04L 1/189

OTHER PUBLICATIONS

Partial International Search Report—PCT/US2021/020568—ISA/EPO—dated Jun. 4, 2021. 26 pages.
QUALCOMM Incorporated: "Enhancements on Multi-Beam Operation", 3GPP Draft, 3GPP TSG RAN WG1 Meeting #100-e, R1-2000975, 3rd Generation Partnership Project (3GPP), Mobile Competence Sophia-Antipolis Cedex, France, vol. RAN WG1, No. Feb. 24, 2020-Mar. 6, 2020, (Feb. 15, 2020), XP051853548, 3 Pages, Retrieved from the ntemet: URL: https://ftp.3gpp.org/tsg_ran/WG1_RL1/TSGR1_100_e/Docs/R1-2000975.zip R1-2000975 Enhancements on Multi-beam Operation.docx—the whole document.

* cited by examiner

MANAGING TRANSMIT POWER CONTROL

CROSS-REFERENCE TO RELATED APPLICATIONS

This application claims the benefit of priority to U.S. Provisional Application No. 62/994,232 entitled "MANAGING TRANSMIT POWER CONTROL" filed Mar. 24, 2020, the entire contents of which are hereby incorporated by reference for all purposes.

TECHNICAL FIELD

This disclosure relates generally to wireless devices, and more particularly to enabling wireless devices to manage an uplink transmit power.

DESCRIPTION OF RELATED TECHNOLOGY

Standards for Fifth Generation (5G) New Radio (NR) propose using millimeter wave ("mmWave") communications to expand communication bandwidth. To provide coverage using millimeter wave frequency bands, a large number of small cells that communicate with a larger base station (such as a macro cell or node, or a central cell or node) via a backhaul communication link may be densely deployed (sometimes termed a "dense deployment"). While the base station has sufficient transmit power to transmit signals to a wireless device, the transmit power and battery storage of the wireless device may be relatively limited. So, some dense deployments may include uplink receive (UL Rx) points to receive a signal from a wireless device and convey the received signal to a base station via a backhaul communication link. However, in such deployments, the wireless device may not receive path loss information from a UL Rx point, which the wireless device would otherwise use to determine a transmit power for signal transmissions to the UL Rx point.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless device that receives a message from a base station including a path loss value, and transmits a signal to an uplink (UL) receive (Rx) point using an uplink transmit power associated with the received path loss value. associated with. In some implementations, the path loss value may include a physical uplink shared channel (PUSCH) path loss value. In such aspects, transmitting the signal to the UL Rx point may include transmitting the signal to the UL Rx point using a PUSCH uplink transmit power associated with the PUSCH path loss value associated with. In some implementations, the path loss value may include a physical uplink control channel (PUCCH) path loss value. In such implementations, transmitting the signal to the UL Rx point may include transmitting the signal to the UL Rx point using a PUCCH uplink transmit power associated with the PUCCH path loss value. In some aspects, the path loss value may include a sounding reference signal (SRS) path loss value. In such implementations, transmitting the signal to the UL Rx point may include transmitting the signal to the UL Rx point using an SRS transmit power associated with the received SRS path loss value.

In some implementations, receiving a message including a path loss value may include receiving an indication of a set of path loss values and an indication of one of the set of path loss values. In such implementations, transmitting the signal to the UL Rx point may include transmitting the signal to the UL Rx point using an uplink transmit power associated with the received indication of the set of path loss values and the received indication of the one of the set of path loss values. In some implementations, the indication of the set of path loss values may be received via one of radio resource control (RRC) signaling or a medium access control (MAC)-control element (CE) message. In some implementations, the indication of the one of the set of path loss values may include an indication of a PUSCH path loss value via a sounding reference signal resource indicator (SRI) field in a downlink control information (DCI) message. In some implementations, the indication of the one of the set of path loss values may include an indication of a PUCCH path loss value via a MAC-CE message. In some implementations, the indication of the one of the set of path loss values may include an indication of an SRS path loss value via a MAC-CE message. Some implementations may include determining the uplink transmit power using the received path loss value. Some implementations may include transmitting a signal for initial access communications to the base station using a transmit power associated with a downlink reference signal from the base station. Some implementations may include sending a message indicating that the wireless device is capable of determining the uplink transmit power associated with the received path loss value. Some implementations may include sending a signal to enable a path loss measurement, and receiving from the base station the message including the path loss value in response to the signal.

Another innovative aspect of the subject matter described in this disclosure may be implemented in an apparatus of a wireless device. Some implementations may include a transceiver, and a processing system coupled to the transceiver and configured to receive from a base station a message including a path loss value, and transmit a signal to a UL RX point using an uplink transmit power associated with the received path loss value.

Another innovative aspect of the subject matter described in this disclosure may be implemented in a non-transitory processor-readable medium that includes stored thereon processor-executable instructions configured to cause a wireless device processing system to perform various operations, some implementations of which may include receiving from a base station a message including a path loss value, and transmitting a signal to a UL Rx point using an uplink transmit power associated with the received path loss value.

Another innovative aspect of the subject matter described in this disclosure can be implemented in a wireless device that includes means for receiving from a base station a message including a path loss value, and means for transmitting a signal to an uplink (UL) receive (Rx) point using an uplink transmit power associated with the received path loss value.

Another innovative aspect of the subject matter described in this disclosure may be implemented as a method performed in a wireless device. Some implementations may include receiving a reference signal, receiving a message including an offset value, and transmitting a signal to an uplink (UL) receive (Rx) point using an uplink transmit power that includes a downlink path loss value associated with the reference signal minus the received offset value. In some implementations, the offset value may include a physical uplink shared channel (PUSCH) offset value, and transmitting the signal to the UL Rx point may include transmitting the signal to the UL Rx point using a PUSCH uplink transmit power that may include the downlink path loss value minus the PUSCH offset value.

In some implementations, the offset value may include a PUCCH offset value, and transmitting the signal to the UL Rx point may include transmitting the signal to the UL Rx point using a PUCCH uplink transmit power that may include the downlink path loss value minus the PUCCH offset value. In some implementations, the offset value may include an SRS offset value, and transmitting the signal to the UL Rx point may include transmitting the signal to the UL Rx point using an SRS transmit power that may include the downlink path loss value minus the received SRS offset value.

In some implementations, receiving a message including an offset value may include receiving an indication of a set of offset values and an indication of one of the set of offset values, and transmitting the signal to the UL Rx point may include transmitting the signal to the UL Rx point using an uplink transmit power associated with the received indication of the set of offset values and the received indication of the one of the set of offset values.

In some implementations, the indication of the set of offset values may be received via one of RRC signaling or a MAC-CE message. In some implementations, the indication of the one of the set of offset values may include an indication of a PUSCH offset value via an SRI field in a DCI message. In some implementations, the indication of the one of the set of offset values may include an indication of a PUCCH offset value via a MAC-CE message. In some implementations, the indication of the one of the set of offset values may include an indication of an SRS offset value via a MAC-CE message. Some implementations may include determining the downlink path loss value associate with reference signal. Some implementations may include transmitting a signal for initial access communications to a base station using a transmit power associated with a downlink reference signal from the base station.

Another innovative aspect of the subject matter described in this disclosure can be implemented in an apparatus of a wireless device. Some implementations may include a transceiver, and a processing system coupled to the transceiver and configured to receive a reference signal, and transmit a signal to an uplink (UL) receive (Rx) point using an uplink transmit power that may include a downlink path loss value associated with the reference signal minus the received offset value.

Another innovative aspect of the subject matter described in this disclosure may be implemented in a non-transitory processor-readable medium having stored thereon processor-executable instructions configured to cause a wireless device processing system to perform operations including receiving a reference signal, receiving a message including an offset value, and transmitting a signal to an uplink (UL) receive (Rx) point using an uplink transmit power that may include a downlink path loss value associated with the reference signal minus the received offset value.

Another innovative aspect of the subject matter described in this disclosure may be implemented in a wireless device that includes means for receiving a reference signal, means for receiving a message including an offset value, and means for transmitting a signal to an uplink (UL) receive (Rx) point using an uplink transmit power that may include a downlink path loss value associated with the reference signal minus the received offset value.

Another innovative aspect of the subject matter described in this disclosure may be implemented in a base station. Some implementations may include methods performed by an apparatus of a base station for managing transmit power of a wireless device. Various implementations may include receiving a power measurement of a signal from a wireless device, and sending to the wireless device a path loss value associated with the received power measurement to enable the wireless device to select an uplink transmit power. Some implementations may include determining the path loss value associated with the received power measurement of the signal from the wireless device.

In some implementations, the path loss value may include a PUSCH path loss value. In some implementations, the path loss value may include a PUCCH path loss value. In some implementations, the path loss value may include an SRS path loss value. In some implementations, the path loss value may include an indication of a set of path loss values and an indication of one of the set of path loss values.

In some implementations, sending to the wireless device an indication of a set of path loss values may include sending the indication of the set of path loss values via one of RRC signaling or a MAC)-CE message. In some implementations, sending to the wireless device the path loss value may include sending an indication of a PUSCH path loss value via an SRI field in a DCI message. In some implementations, sending to the wireless device the path loss value may include sending an indication of a PUCCH path loss value via a MAC-CE message. In some implementations, sending to the wireless device the path loss value may include sending an indication of an SRS path loss value via a MAC-CE message.

Another innovative aspect of the subject matter described in this disclosure may be implemented in an apparatus of a base station. Some implementations may include a transceiver and a processing system coupled to the transceiver and configured to obtain a power measurement of a signal from a wireless device, and send to the wireless device a path loss value associated with the received power measurement configured to enable the wireless device to select an uplink transmit power.

Another innovative aspect of the subject matter described in this disclosure can be implemented in a non-transitory processor-readable medium having stored thereon processor-executable instructions configured to cause a base station processing system to perform operations, some implementations of which may include receiving a power measurement of a signal from a wireless device, and sending to the wireless device a path loss value associated with the received power measurement configured to enable the wireless device to select an uplink transmit power.

Another innovative aspect of the subject matter described in this disclosure can be implemented in a base station that includes means for obtaining a power measurement of a signal from a wireless device, and means for sending to the wireless device a path loss value associated with the received power measurement configured to enable the wireless device to select an uplink transmit power.

Another innovative aspect of the subject matter described in this disclosure can be implemented in a base station. Some implementations may include methods performed by an apparatus of a base station for managing transmit power of a wireless device. Various implementations may include receiving a power measurement of a signal from a wireless device, and sending to the wireless device an offset value associated with the received power measurement configured to enable the wireless device to adjust an uplink transmit power. Some implementations may further include determining the offset value using the received power measurement of the signal from the wireless device.

In some implementations, the offset value may include a PUSCH offset value. In some implementations, the offset value may include a PUCCH offset value. In some implementations, the offset value may include an SRS offset value. In some implementations, the offset value may include an indication of a set of offset values and an indication of one of the set of offset values.

In some implementations, sending to the wireless device the indication of the set of offset values may include sending the indication of the set of offset values via one of RRC signaling or a MAC-CE message. In some implementations, sending to the wireless device the offset value may include sending an indication of a PUSCH offset value via an SRI field in a DCI message. In some implementations, sending to the wireless device the offset value may include sending an indication of a PUCCH offset value via a MAC-CE message. In some implementations, sending to the wireless device the offset value may include sending an indication of an SRS offset value via a MAC-CE message.

Another innovative aspect of the subject matter described in this disclosure can be implemented in an apparatus of a base station. Some implementations may include a transceiver, and a processing system coupled to the transceiver and configured to receive a power measurement of a signal from a wireless device, and send to the wireless device an offset value associated with the received power measurement to enable the wireless device to adjust an uplink transmit power. In some implementations, the processing system may be further configured to determine the offset value using the received power measurement of the signal from the wireless device.

Another innovative aspect of the subject matter described in this disclosure can be implemented in a non-transitory processor-readable medium having stored thereon processor-executable instructions configured to cause a base station processing system to perform operations, some implementations of which may include receiving a power measurement of a signal from a wireless device, and sending to the wireless device an offset value associated with the received power measurement configured to enable the wireless device to adjust an uplink transmit power.

Another innovative aspect of the subject matter described in this disclosure may be implemented in a base station having means for receiving a power measurement of a signal from a wireless device, and means for sending to the wireless device an offset value associated with the received power measurement to enable the wireless device to adjust an uplink transmit power.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
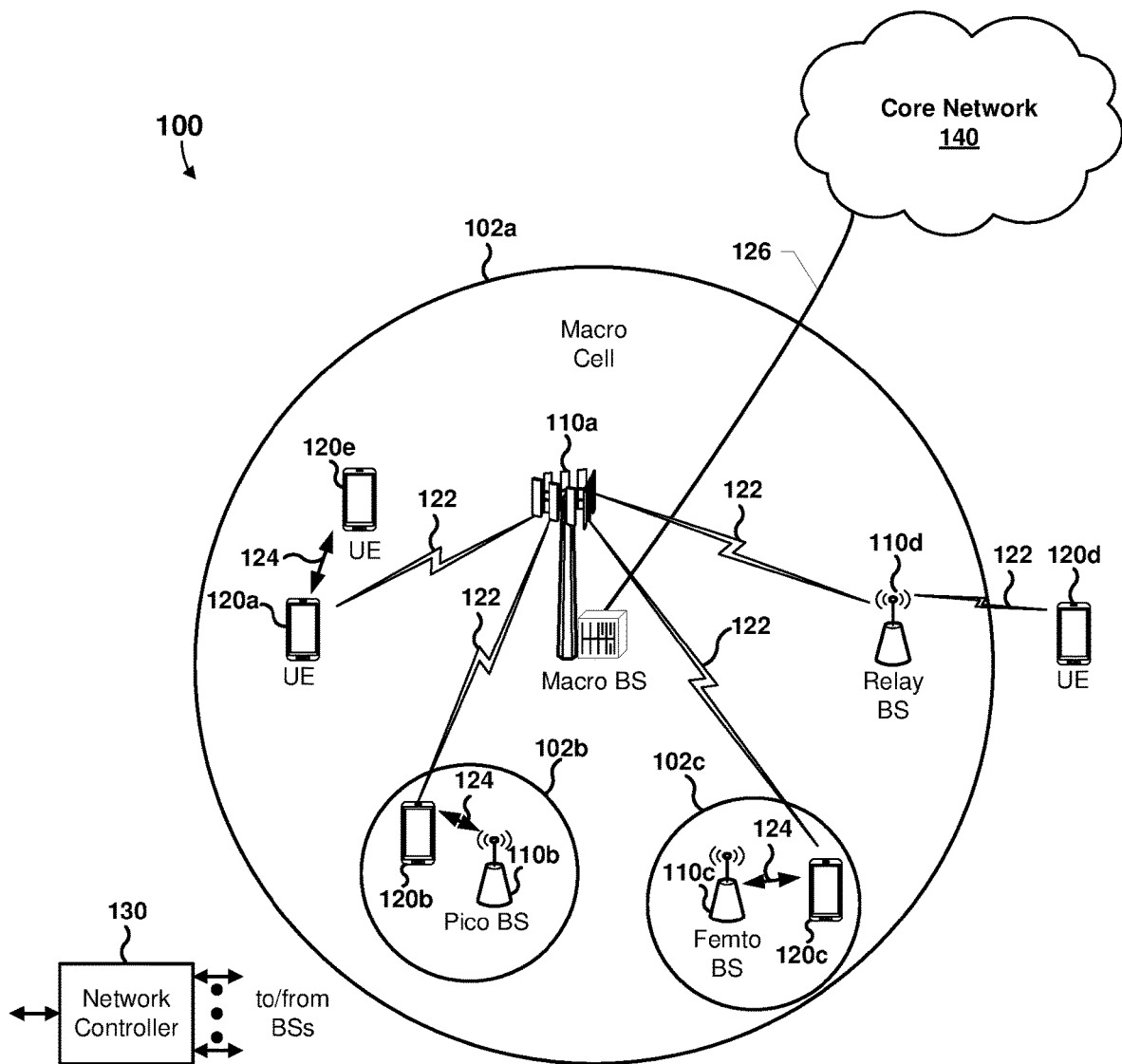
FIG. 1 shows a system block diagram of an example communications system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

Various implementations enable a wireless device to manage transmit power control communications with an uplink receive (UL Rx) point. In a dense deployment using UL Rx points (sometimes referred to as an "uplink dense deployment"), the base station transmits a downlink signal to the wireless device, and the wireless device transmits an uplink signal to the UL Rx point. Since the downlink transmission is from the base station to the wireless device and the uplink transmission is from the wireless device to the UL Rx point, in an uplink dense deployment using UL Rx points, the uplink and the downlink are asymmetrical. In such communication systems, the wireless device cannot use a downlink reference signal to measure the reference signal, calculate a path loss value, or determine an uplink transmit power based on a calculated path loss. To address this challenge, in various implementations, the base station may be configured to determine a path loss value, a set of path loss values, a path loss offset value, or a set of path loss offset values, and convey the determined value(s) to the wireless device.

In various implementations, an apparatus, such as a processor, of the wireless device may receive a message from a base station (for example, a macro cell, a macro node, a central cell, a central node, or another suitable large base station) including a path loss value. The wireless device may use the path loss value to determine an uplink transmit power, for example, for a transmission to the UL Rx point. The base station may determine the path loss value based on a measurement performed by the UL Rx point of a signal that the UL Rx point receives from the wireless device. In some implementations, the UL Rx may perform processing of the uplink signal received from the wireless device before sending the received signal to the base station (in which case the UL Rx point sends to the base station a processed uplink signal). In some implementations, the UL RX point may perform little or no processing of the received uplink signal prior to sending the received signal to the base station.

In some implementations, the path loss value may include a physical uplink shared channel (PUSCH) path loss value. In some implementations, the path loss value may include a physical uplink control channel (PUCCH) path loss value. In some implementations, the path loss value may include a sounding reference signal (SRS) path loss value.

In some implementations, instead of a path loss value, the base station may transmit, and the wireless device may receive, an indication (such as an index) of a set of path loss values and an indication of one of the set of path loss values. In such implementations, the wireless device may use the indicated path loss value from the set of path loss values to determine an uplink transmit power.

The indication of the set of path loss values and the indication of the path loss value in the set may be conveyed using various signaling mechanisms. In some implementations, the indication of the set of path loss values may be sent via a radio resource control (RRC) signaling or a medium access control (MAC)-control element (CE) message. In some implementations, the indication of a PUSCH path loss value may be sent via a sounding reference signal resource indicator (SRI) field in a downlink control information (DCI) message. In some implementations, the indication of a PUCCH path loss value may be sent via a MAC-CE message. In some implementations, the indication of an SRS path loss value may be sent via a MAC-CE message.

In some implementations, rather than a path loss value, the base station may determine an offset value based on the power measurement that the base station receives from the UL Rx point of the signal from the wireless device, and may send the determined offset value to the wireless device. In such implementations, the wireless device may use the offset value to adjust an uplink transmit power, for example, for a transmission to the UL Rx point. In some implementations, the offset value may include a PUSCH offset value. In some implementations, the offset value may include a PUCCH offset value. In some implementations, the offset value may include an SRS offset value.

In some implementations, instead of an offset value, the base station may transmit, and the wireless device may receive, an indication (such as an index) of a set of offset values and an indication of one of the set of offset values. In such implementations, the wireless device may use the indicated offset value from the set of offset values to adjust an uplink transmit power.

The indication of the set of offset values and the indication of the offset value in the set may be conveyed using various signaling mechanisms. In some implementations, the indication of the set of offset values may be sent via a RRC signaling or a MAC-CE message. In some implementations, the indication of a PUSCH offset value may be sent via an SRI field in a DCI message. In some implementations, the indication of a PUCCH offset value may be sent via a MAC-CE message. In some implementations, the indication of an SRS offset value may be sent via a MAC-CE message.

Particular implementations of the subject matter described in this disclosure can be implemented to realize one or more of the following potential advantages. Some implementations may improve the operations of a wireless device and a communication network by enabling the wireless device to select or otherwise determine an uplink transmit power that is appropriate for the device to which the wireless device is transmitting, such as an UL RX point. Some implementations may improve the operations of the communication network by enabling the base station to determine path loss information or offset information and to provide that information to the wireless device for use in determine an appropriate uplink transmit power. Uplink dense deployments may enable the wireless device and the communication network to operate more efficiency, and may permit the wireless device to conserve battery power by using lower uplink power to communicate with a nearby UL RX point. The various implementations may enable the wireless device to determine the proper uplink power control in uplink dense deployments. Various implementations may enable lower cost communication networks in some locations because each UL point in an uplink dense deployment needs to have receive capabilities compared to dense deployments of access points with equipment to function as both UL RX points and DL TX points.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (such as smart rings, smart bracelets, etc.), entertainment devices (such as wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable apparatus (such as a processing system).

The term "system on chip" (SOC) is used herein to refer to a single integrated circuit (IC) chip that contains an apparatus (such as a processing system) of multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains an apparatus (such as a processing system) of multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "processing system" is used herein to refer to a processor, a SOC, or a SIP, coupled to or including a memory device.

FIG. 1 shows a system block diagram illustrating an example communications system 100. The communications system 100 may be a 5G NR network, or any other suitable network such as an LTE network.

The communications system 100 may include a heterogeneous network architecture that includes a core network 140 and a variety of mobile devices (illustrated as wireless device 120a-120e in FIG. 1). The communications system 100 also may include a number of base stations (illustrated as the BS 110a, the BS 110b, the BS 110c, and the BS 110d) and other network entities. In some implementations, one or more of the base stations (such as 110b, 110c) may be configured to function as an uplink receive (UL Rx) point.

A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a mobile device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

Wired communication links may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, various implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other mobile devices). In this example, the wireless device is functioning as a scheduling entity, and other mobile devices utilize resources scheduled by the wireless device for wireless communication. A wireless device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
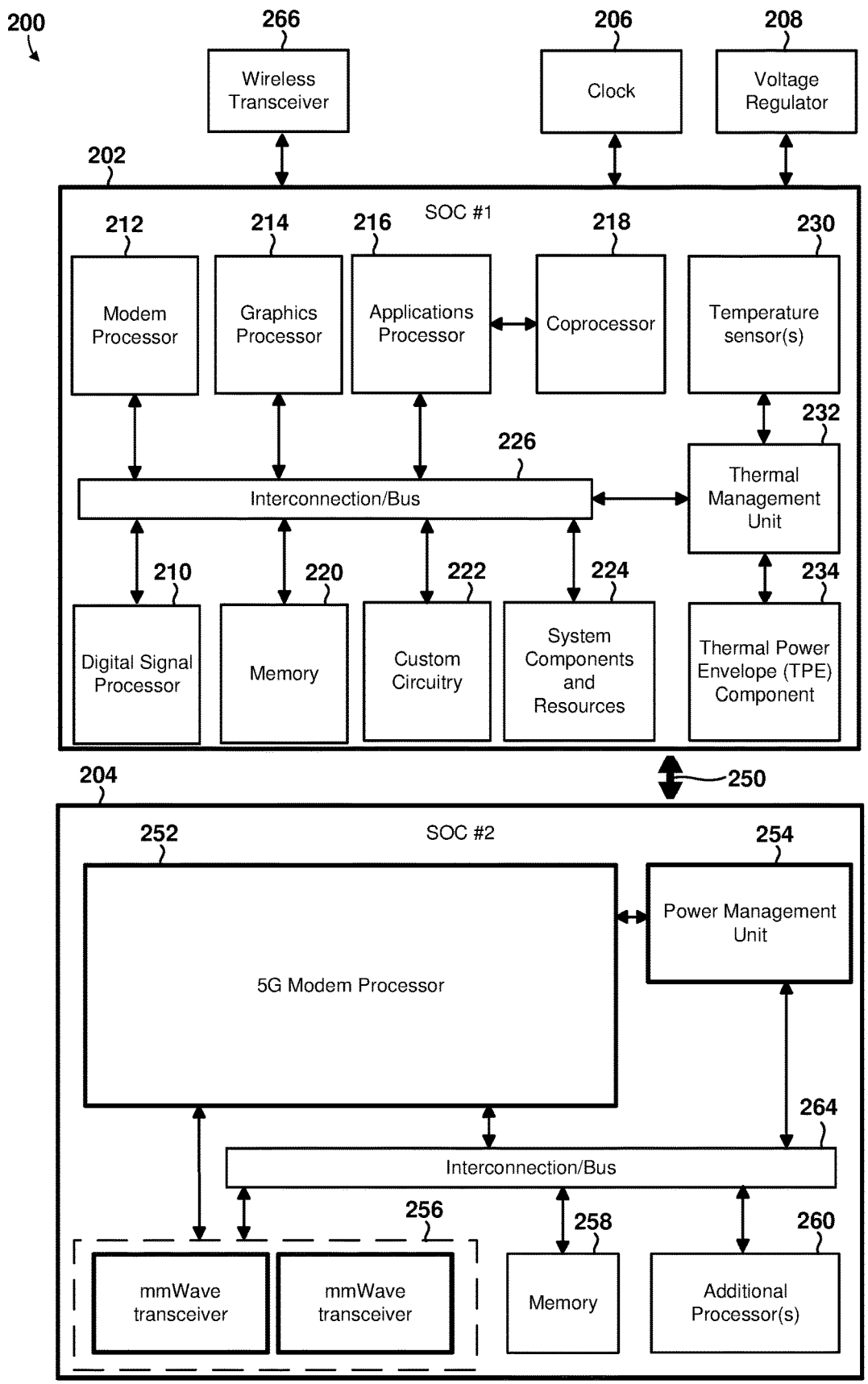
FIG. 2 shows a component block diagram of an example computing system.

FIG. 2 shows a component block diagram of an example computing system 200. Various implementations may be implemented on a number of single processor and multi-processor computer systems, including a system-on-chip (SOC) or system in a package (SIP).

With reference to FIGS. 1 and 2, the illustrated example computing system 200 (which may be a SIP in some implementations) includes two SOCs 202, 204 coupled to a clock 206, and a voltage regulator 208, and a wireless transceiver 266 configured to send and receive wireless communications via an antenna (not shown) to or from wireless devices, such as a base station 110a. In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 in an apparatus (such as a processing system) may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.). In some implementations, any or all of the processors 210, 212, 214, 216, 218, 252, 260 may be a component of a processing system. A processing system may generally refer to a system or series of machines or components that receives inputs and processes the inputs to produce a set of outputs (which may be passed to other systems or components of, for example, the first SOC 202 or the second SOC 250). For example, a processing system of the first SOC 202 or the second SOC 250 may refer to a system including the various other components or subcomponents of the first SOC 202 or the second SOC 250.

The processing system of the first SOC 202 or the second SOC 250 may interface with other components of the first SOC 202 or the second SOC 250, and may process information received from other components (such as inputs or signals), output information to other components, etc. For example, a chip or modem of the first SOC 202 or the second SOC 250 may include a processing system, a first interface to output information, and a second interface to receive information. In some cases, the first interface may refer to an interface between the processing system of the chip or modem and a transmitter, such that the first SOC 202 or the second SOC 250 may transmit information output from the chip or modem. In some cases, the second interface may refer to an interface between the processing system of the chip or modem and a receiver, such that the first SOC 202 or the second SOC 250 may receive information or signal inputs, and the information may be passed to the processing system. A person having ordinary skill in the art will readily recognize that the first interface also may receive information or signal inputs, and the second interface also may transmit information.

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, various implementations may be implemented in a wide variety of processing systems, which may include a single processor, multiple processors, multicore processors, or any combination thereof.

Figure 3:
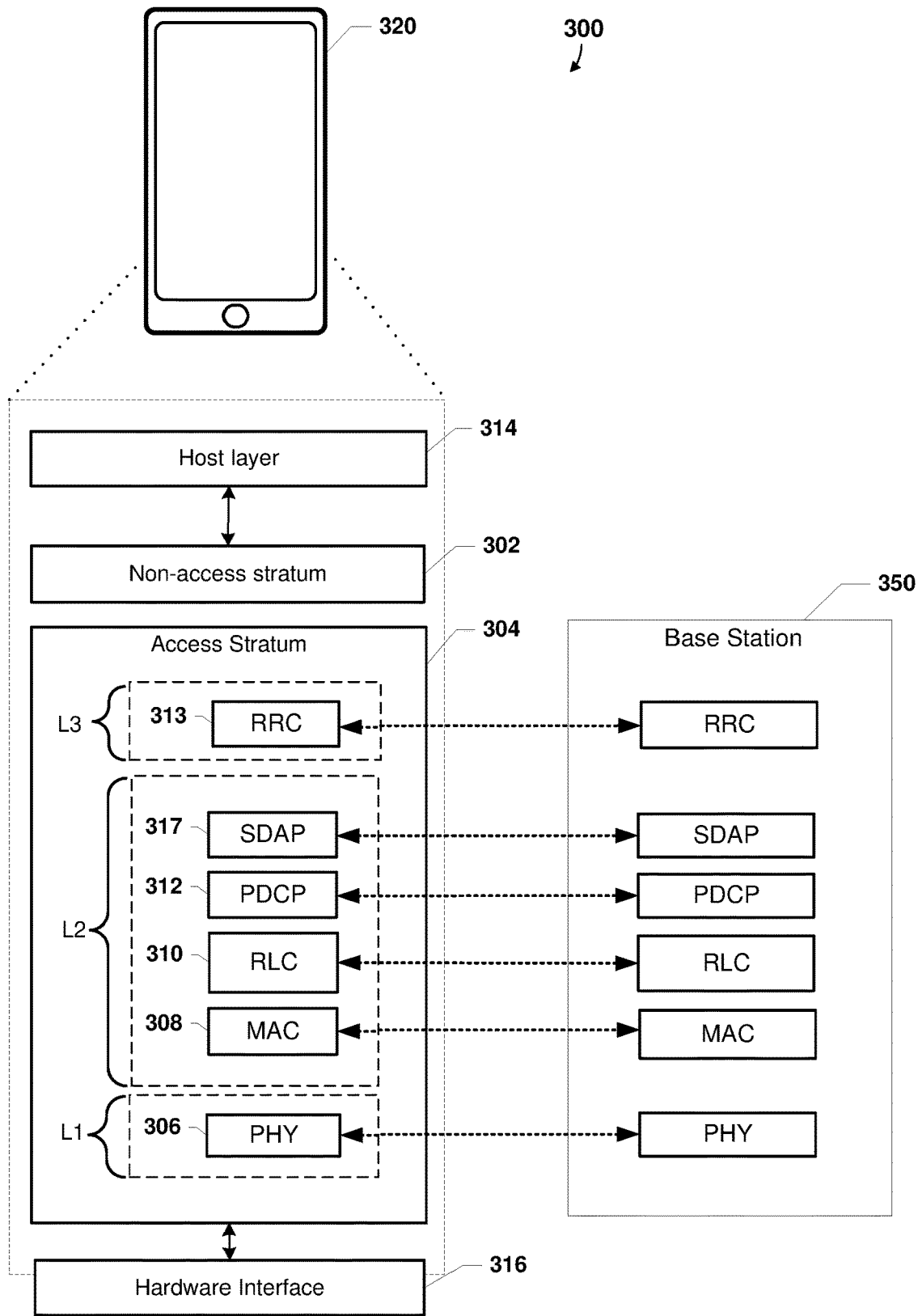
FIG. 3 shows a component block diagram of an example of a software architecture including a radio protocol stack for the user and control planes in wireless communications.

FIG. 3 shows a component block diagram of an example of a software architecture 300 including a radio protocol stack for the user and control planes in wireless communications. The software architecture 300 including a radio protocol stack for the user and control planes in wireless communications between a base station 350 (such as the base station 110a) and a wireless device 320 (such as the wireless device 120a-120e, 200). With reference to FIGS. 1-3, the wireless device 320 may implement the software architecture 300 to communicate with the base station 350 of a communication system (such as the communications system 100). In various implementations, layers in software architecture 300 may form logical connections with corresponding layers in software of the base station 350. The software architecture 300 may be distributed among one or more processing systems (such as the processors 212, 214,

216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to specific 5G NR communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (such as the wireless transceiver 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions INCLUDING broadcasting system information, paging, and establishing and releasing an RRC signaling connection between the wireless device 320 and the base station 350.

In some implementations, the SDAP sublayer 317 may provide mapping between Quality of Service (QoS) flows and data radio bearers (DRBs). In the downlink, at the base station 350, the SDAP sublayer 317 may provide mapping for DL QoS flows to DRBs. In the uplink, at the wireless device 120, the SDAP sublayer 317 may deliver DL received QoS flows to upper layers. In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In some other implementations, the software architecture 300 may include one or more higher logical layer (such as transport, session, presentation, application, etc.) that provide host layer functions. For example, in some implementations, the software architecture 300 may include a network layer (such as Internet Protocol (IP) layer) in which a logical connection terminates at an access and mobility factor (AMF) or a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
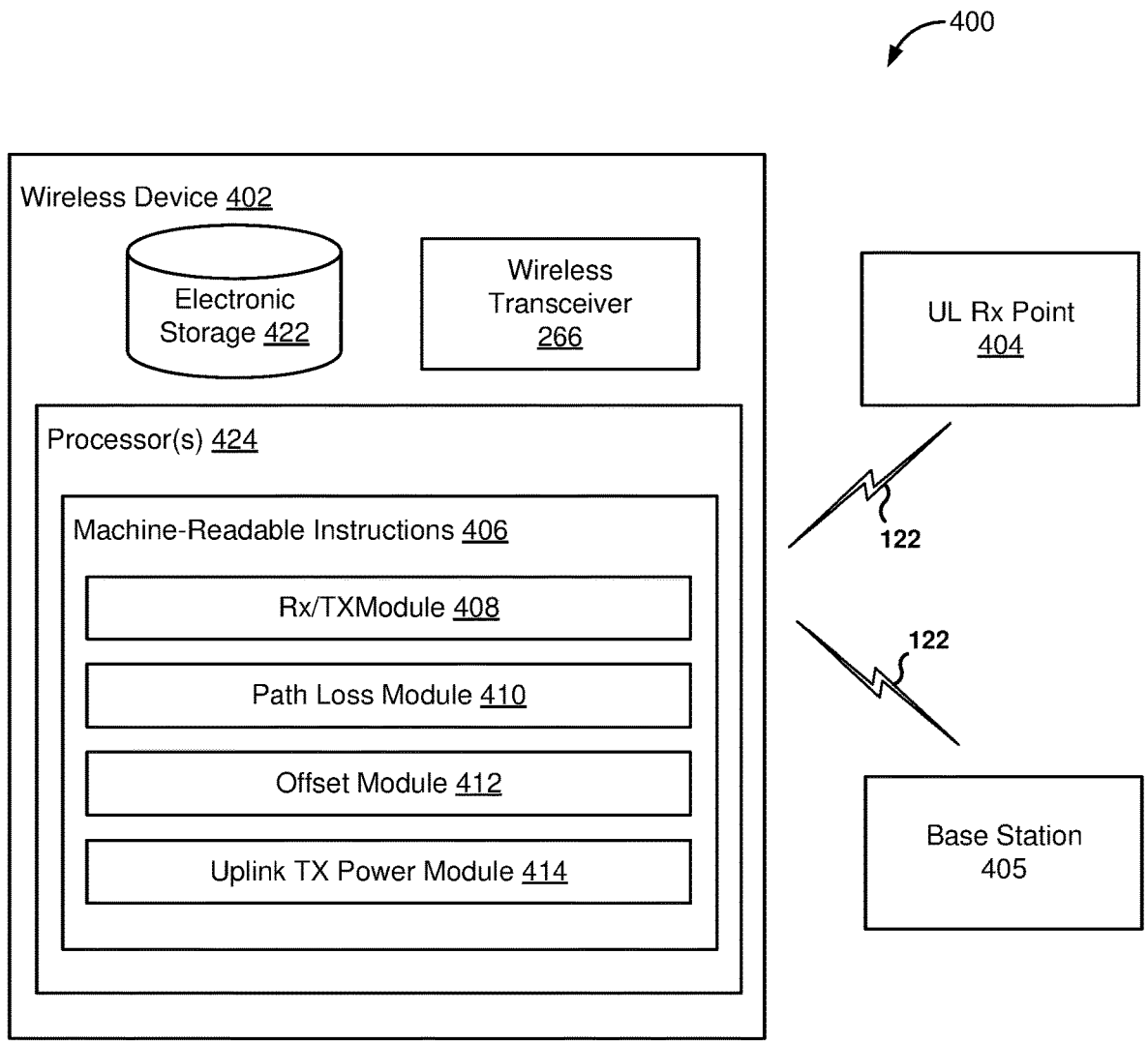
FIGS. 4A and 4B show component block diagrams of an example system configured to manage transmit power control.
Figure 4B:
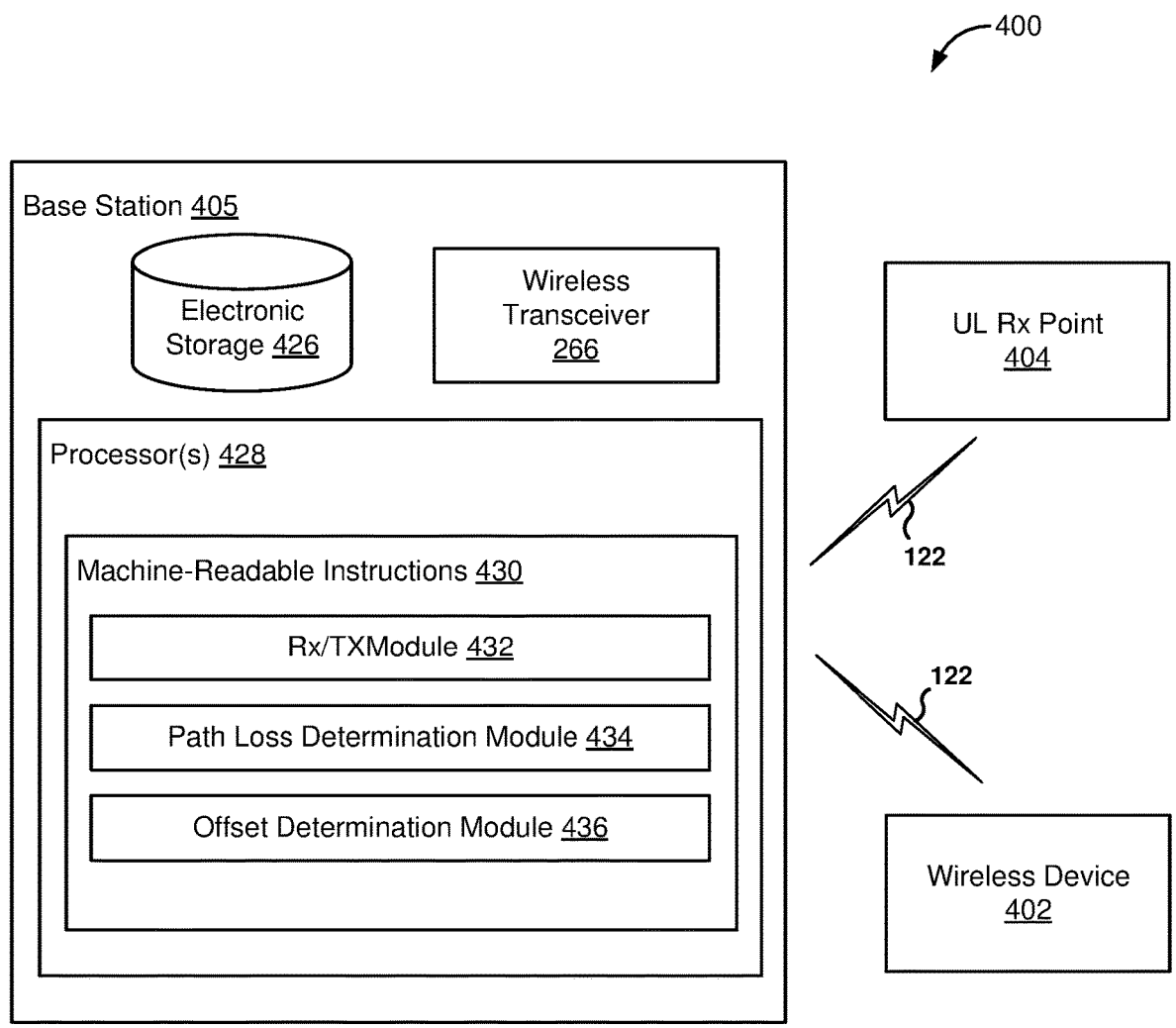

FIGS. 4A and 4B show component block diagrams of an example system 400 configured to manage transmit power control. With reference to FIGS. 1-4B, the system 400 may include a wireless device 402 (such as 120*a*-120*e*, 200, 320), an UL Rx point 404 (such as 110*b*, 110*c*), and a base station 405 (such as 110*a*).

The wireless device 402 may include one or more processors 424 that may be configured by machine-readable instructions 406. Machine-readable instructions 406 may include one or more instruction modules. The instruction modules may include computer program modules. The instruction modules may include one or more of a receiver/transmitter (Rx/Tx) module 408, a path loss module 410, an offset module 412, an uplink transmission power module 414, and other instruction modules.

The receiver/transmitter module 408 may be configured to receive a message including a path loss value. The receiver/transmitter module 408 may be configured to receive a message including an offset value. The receiver/transmitter module 408 may be configured to transmit a signal (such as to an UL Rx point) using a determined uplink transmit power.

The path loss module 410 may be configured to determine a path loss value in a signal received, for example, from the base station 405.

The offset module 412 may be configured to determine an offset value in a signal received, for example, from the base station 405.

The uplink transmission power module 414 may be configured to determine an uplink transmit power based on a received path loss value. The uplink transmission power module 414 may be configured to adjust an uplink transmit power based on a received offset value.

The base station 405 may include one or more processors 428 that may be configured by machine-readable instructions 430. Machine-readable instructions 406 may include one or more instruction modules. The instruction modules may include computer program modules. The instruction modules may include one or more of a receiver/transmitter (Rx/Tx) module 432, a path loss determination module 434, an offset determination module 436, and other instruction modules.

The receiver/transmitter module 432 may be configured to receive a power measurement of a signal from a wireless device. For example, the receiver/transmitter module 432 may be configured to receive from the UL RX point 404 a power measurement that the UL Rx point 404 performs on a signal received by the UL Rx point 404 from the wireless device 402. The receiver/transmitter module 432 may be configured to send a signal or message to the wireless device 402 including a path loss value or an offset value.

The path loss determination module 434 may be configured to determine a path loss value based on the power measurement of the signal sent by the wireless device 402.

The offset determination module 436 may be configured to determine an offset value based on the power measurement of the signal sent by the wireless device 402.

The wireless device 402 and the base station 405 may include an electronic storage 422, 426, one or more processors 424, 428, or other components. The wireless device 402 and the base station 405 may include communication lines, or ports to enable the exchange of information with a network or other computing platforms. The illustrations of the wireless device 402 and the base station 405 are not intended to be limiting, and the wireless device 402 and the base station 405 may include a plurality of hardware, software, or firmware components operating together to provide the functionality attributed herein to the wireless device 402 and the base station 405.

The electronic storage 422, 426 may include non-transitory storage media that electronically stores information. The storage media of the electronic storage 422, 426 may include one or both of system storage that is provided integrally (i.e., substantially non-removable) with the wireless device 402 or the base station 405 or removable storage that is removably connectable to wireless device 402 or the base station 405 via, for example, a port (such as a universal serial bus (USB) port, a firewire port, etc.) or a drive (such as a disk drive, etc.). The electronic storage 422, 426 may include one or more of optically readable storage media (such as optical disks, etc.), magnetically readable storage media (such as magnetic tape, magnetic hard drive, floppy drive, etc.), electrical charge-based storage media (such as EEPROM, RAM, etc.), solid-state storage media (such as a flash drive, etc.), or other electronically readable storage media. The electronic storage 422, 426 may include one or more virtual storage resources (such as cloud storage, a virtual private network, or other virtual storage resources). The electronic storage 422, 426 may store software algorithms, information determined by processor(s) 424, 428, information received from the wireless device 402, information received from the UL Rx point 404, information received from the base station 405, or other information that enables each device to function as described herein.

Processor(s) 424, 428 may be configured to provide information processing capabilities in the wireless device 402. As such, processor(s) 424, 428 may include one or more of a digital processor, an analog processor, a digital circuit designed to process information, an analog circuit designed to process information, a state machine, or other mechanisms for electronically processing information. Although processor(s) 424, 428 are shown as a single entity, this is for illustrative purposes only. In some implementations, processor(s) 424, 428 may include a plurality of processing units. These processing units may be physically located within the same device, or processor(s) 424, 428 may represent processing functionality of a plurality of devices operating in coordination. Processor(s) 424, 428 may be configured to execute modules 408-414 and 432-436, or other modules. Processor(s) 424, 428 may be configured to execute modules 408-414 and 432-436, or other modules by software; hardware; firmware; some combination of software, hardware, or firmware; or other mechanisms for configuring processing capabilities on the processor(s) 408-414 and 432-436. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 and 432-436 described below is for illustrative purposes, and is not intended to be limiting, as any of the modules 408-414 and 432-436 may provide more or less functionality than is described. For example, one or more of modules 408-414 and 432-436 may be eliminated, and some or all of its functionality may be provided by other ones of the modules 408-414 and 432-436. As another example, processor(s) 408-414 and 432-436 may be configured to execute one or more additional modules that may perform some or all of the functionality attributed below to one of the modules 408-414 and 432-436.

Figure 4C:
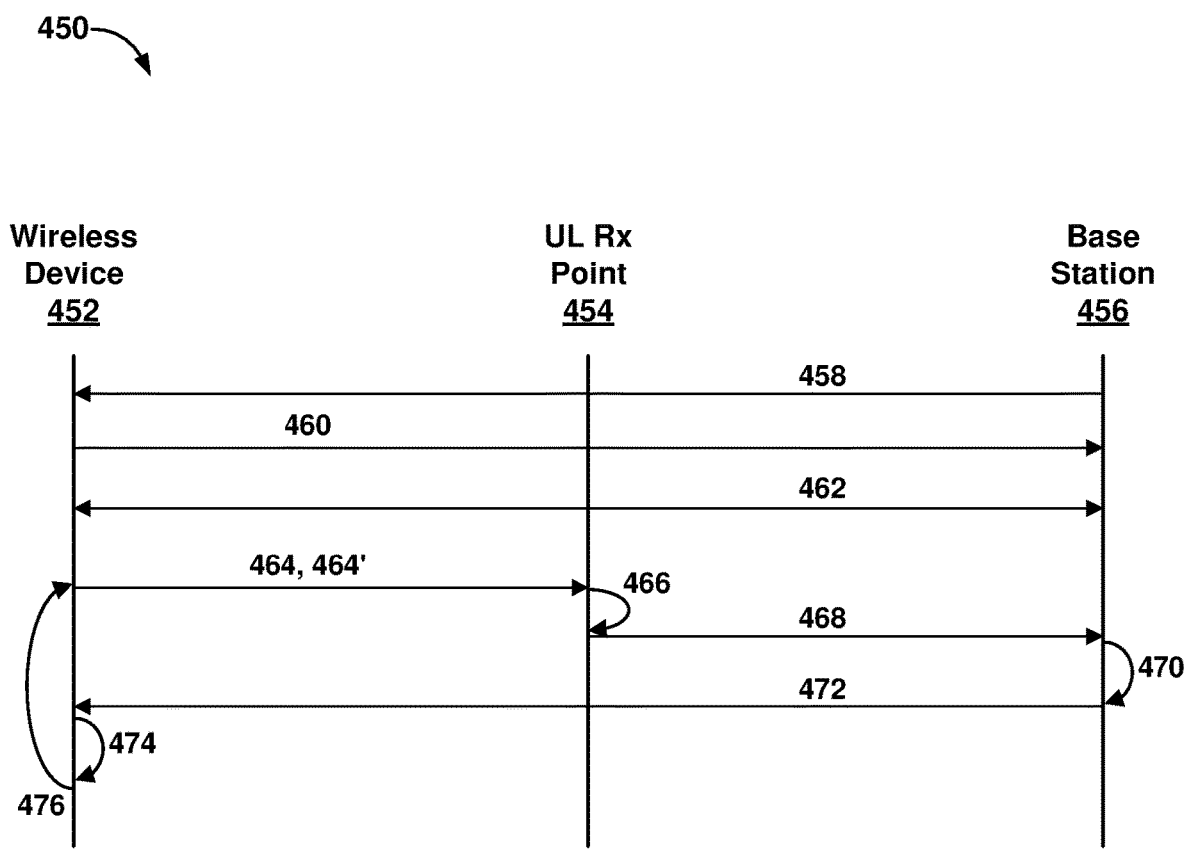
FIG. 4C shows a signal flow diagram of an example method for managing transmit power control.

FIG. 4C shows a signal flow diagram 450 of an example method for managing transmit power control. With reference to FIGS. 1-4C, the signal flow diagram 450 illustrates a generalized signal flow, details of which are further described below (FIGS. 5A-8E).

In various implementations, as part of an initial access process, a base station 456 (such as the base station 110a, 350, 405) may transmit a downlink reference signal 458 that may be received by a wireless device 452 (such as the wireless device 120a-120e, 200, 320, 402).

The wireless device may transmit a signal 460 for initial access communications to the base station using a transmit power based on the downlink reference signal 458 from the base station.

The wireless device 452 and the base station 456 may establish a communication session 462 following the successful performance of the initial access process.

Thereafter, the wireless device 452 may transmit an uplink signal 464 that is received by an UL Rx point 454 (such as the UL Rx point 110b, 110c, 404). In various implementations, the reception of the uplink signal 464 by the UL Rx point 454 (as opposed to being received by the base station 456) may be transparent to the wireless device 452.

In operation 466, the UL Rx point 454 may perform a power measurement of the received uplink signal 464. In some implementations, the UL Rx point 454 may optionally perform processing of the received uplink signal 464.

The UL Rx point 454 may provide a message 468 including the power measurement of the received uplink signal to the base station 456.

Based on the power measurement received from the UL Rx point 454 by the base station 456, the base station 456 may determine or calculate a value or set of values in operation 470 to be sent to the wireless device 452 to enable the wireless device 452 to determine an uplink transmit power.

The base station 456 may send the determined or calculated value, or an indication of a set of values and an indication of a value from among the set of values, to the wireless device in a message 472. In some implementations, the value may include a path loss value. In some implementations, the value may include a set of path loss values, and an indication of a value from among the set of path loss values. In some implementations, the wireless device 452 may determine an uplink transmit power based on the path loss value, or the indicated path loss value from among the set of path loss values. In some implementations, the value may include an offset value. In some implementations, the value may include a set of offset values, and an indication of an offset value from among the set of offset values. In some implementations, the wireless device 452 may adjust an uplink transmit power based on the offset value, or the indicated offset value from among the set of offset values.

In operation 474, the wireless device 452 may determine an uplink transmit power based on the path loss value, or may adjust an uplink transmit power based on the offset value.

In operation 476, the wireless device 452 may use the determined or adjusted transmit power to transmit a signal 464 to the UL Rx point 454.

Figure 5A:
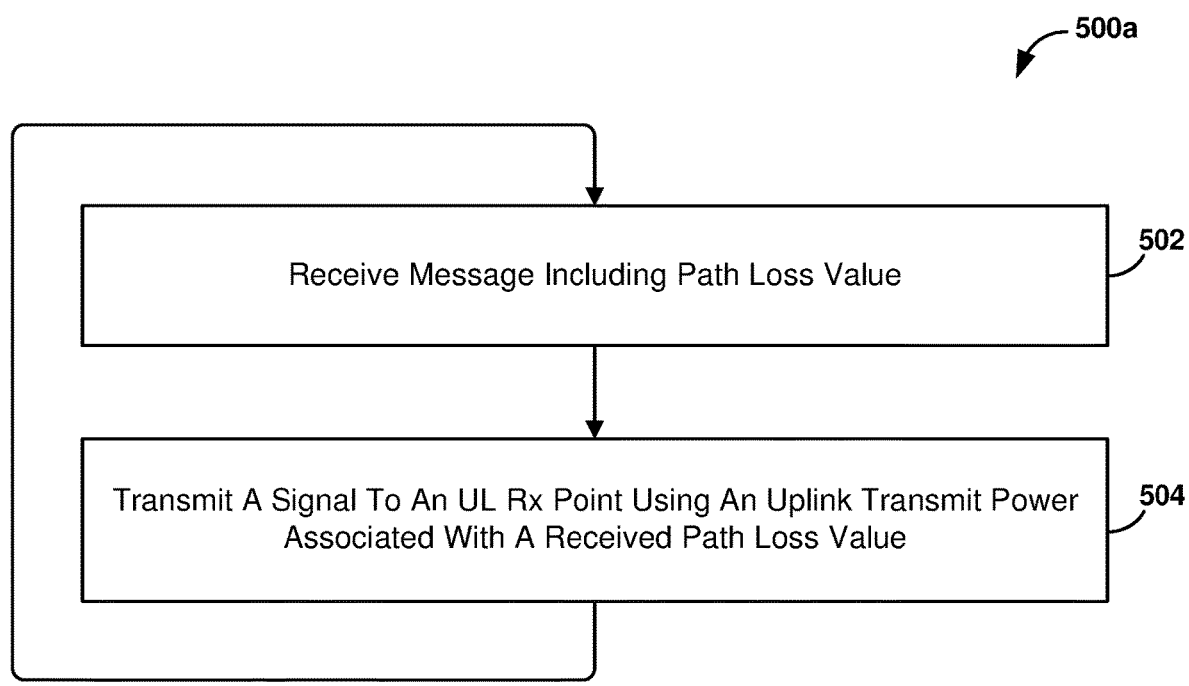
FIG. 5A shows a process flow diagram of an example method for managing transmit power control.

FIG. 5A shows a process flow diagram of an example method 500a for managing transmit power control. With reference to FIGS. 1-5A, the operations of the method 500a may be implemented by an apparatus (such as a processing system) (such as 210, 212, 214, 216, 218, 252, 260, 424) of a wireless device (such as the wireless device 120a-120e, 200, 320, 402).

In block 502, the apparatus may receive a message including a path loss value. For example, the apparatus may receive from a base station a message that includes a path loss value. In some implementations, instead of a reference signal (RS) index that may be found in the message, the message may be configured to include the path loss value. Means for performing functions of the operations in block 502 may include a processor (such as 210, 212, 214, 216, 218, 252, 260, 424) coupled to a wireless transceiver (such as the wireless transceiver 266).

In block 504, the apparatus may transmit a signal to a UL Rx point using an uplink transmit power associated with based on the received path loss value. For example, the apparatus may determine an uplink transmit power of a signal to be transmitted to the UL Rx point that is appropriate to ensure uplink reception in view of (or otherwise based on) the path loss value received from the base station, and then use that uplink transmit power when transmitting signals to the UL Rx point as described herein with reference to FIGS. 5B-5F. Means for performing functions of the operations in block 502 may include the processor (such as 210, 212, 214, 216, 218, 252, 260, 424).

The method 500a may be repeated continuously or periodically as the apparatus may again perform the operations of block 502.

FIGS. 5B-5G show process flow diagrams of example operations 500b-500g that may be performed as part of the method for managing transmit power control. With reference to FIGS. 1-5G, the operations 500b-500g may be implemented by an apparatus (such as a processing system) (such as 210, 212, 214, 216, 218, 252, 260, 424) of a wireless device (such as the wireless device 120a-120e, 200, 320, 404).

Figure 5B:
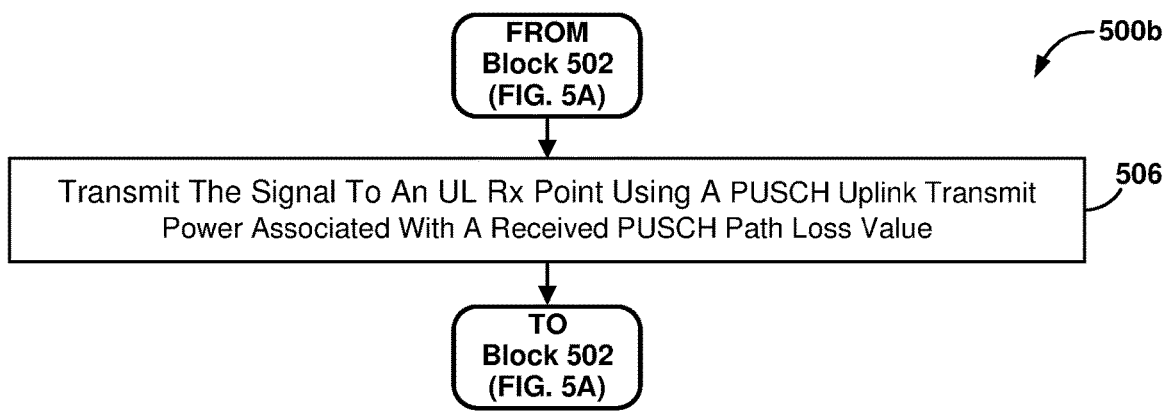
FIGS. 5B-5G show process flow diagrams of example operations that may be performed as part of the method for managing transmit power control.

Referring to FIG. 5B, following the operations of block 502 (FIG. 5A), the apparatus may transmit the signal to the UL Rx point using a physical uplink shared channel (PUSCH) uplink transmit associated with a received PUSCH path loss value in block 506. For example, in some implementations, the path loss value received from the base station may include a PUSCH path loss value. In such implementations, the apparatus may determine a PUSCH uplink transmit power for a signal to be transmitted to the UL Rx point that is appropriate to ensure uplink reception in view of (or otherwise based on) the received PUSCH path loss value. Means for performing functions of the operations in block 506 may include the processor (such as 210, 212, 214, 216, 218, 252, 260, 424) coupled to a wireless transceiver (such as the wireless transceiver 266).

The apparatus may perform the operations of block 502 (FIG. 5A).

Figure 5C:
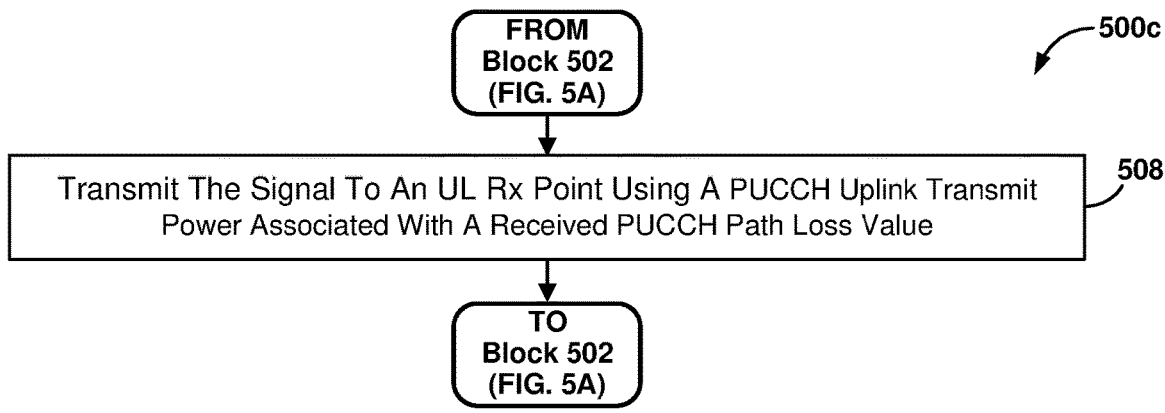

Referring to FIG. 5C, following the operations of block 502 (FIG. 5A), the apparatus may transmit the signal to the UL Rx point using a physical uplink control channel (PUCCH) uplink transmit power associated with a received PUCCH path loss value in block 508. For example, in some implementations, the path loss value received from the base station may include a PUCCH path loss value. In such implementations, the apparatus may determine a PUCCH uplink transmit power for a signal to be transmitted to the UL Rx point that is appropriate to ensure uplink reception in view of (or otherwise based on) the received PUCCH path loss value. Means for performing functions of the operations in block 508 may include the processor (such as 210, 212, 214, 216, 218, 252, 260, 424) coupled to a wireless transceiver (such as the wireless transceiver 266).

The apparatus may perform the operations of block 502 (FIG. 5A).

Figure 5D:
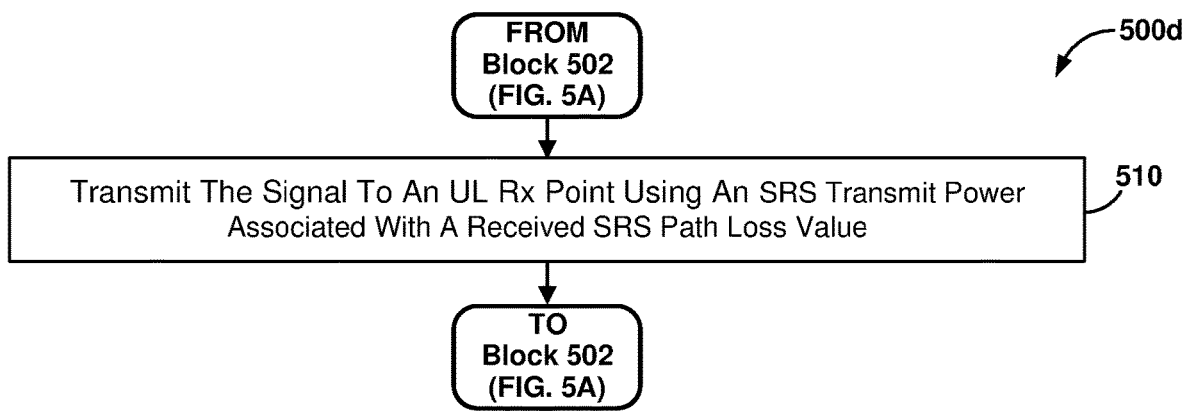

Referring to FIG. 5D, following the operations of block 502 (FIG. 5A), the apparatus may transmit the signal a sounding reference signal (SRS) to the UL Rx point using an SRS uplink transmit power associated with a received SRS path loss value in block 510. For example, in some implementations, the path loss value received from the base station may include an SRS path loss value. In such implementations, the apparatus may determine an SRS uplink transmit power for a signal to be transmitted to the UL Rx point that is appropriate to ensure uplink reception in view of (or otherwise based on) the received SRS path loss value. Means for performing functions of the operations in block 510 may include the processor (such as 210, 212, 214, 216, 218, 252, 260, 424) coupled to a wireless transceiver (such as the wireless transceiver 266).

The apparatus may perform the operations of block 502 (FIG. 5A).

Figure 5E:
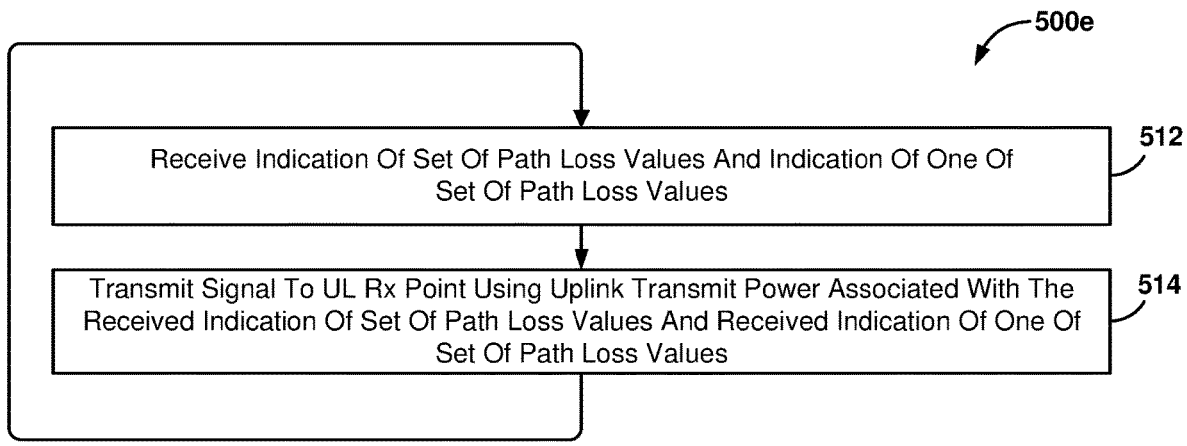

Referring to FIG. 5E, the apparatus may receive an indication of a set of path loss values and an indication of one of the set of path loss values in block 512. In some implementations, rather than a single path loss value, the apparatus may receive a message (for example, from a base station) that includes an indication (such as an index) of a set of path loss values. In some implementations, one or more sets of path loss values may be stored in a memory of the wireless device, and each set of path loss values may be associated with an index value. In some implementations, the message also may indicate which path loss value from among the set of path loss values that the wireless device may use. Means for performing functions of the operations in block 512 may include the processor (such as 210, 212, 214, 216, 218, 252, 260, 424) coupled to a wireless transceiver (such as the wireless transceiver 266).

In some implementations, the apparatus may receive the indication of the set of path loss values via one of radio resource control (RRC) signaling or a medium access control (MAC)-control element (CE) message. In some implementations, for the PUSCH, the set may be configured through RRC signaling or the MAC-CE message. In some implementations, for the PUCCH, or for the SRS, the set may be configured through RRC signaling.

In some implementations, the indication of the one of the set of path loss values may include an indication of a PUSCH path loss value via a sounding reference signal resource indicator (SRI) field in a downlink control information (DCI) message. In some implementations, the indication of the one of the set of path loss values may include an indication of a PUCCH path loss value via a MAC-CE message. In some implementations, the indication of the one of the set of path loss values may include an indication of an SRS path loss value via a MAC-CE message.

In block 514, the apparatus may transmit the signal to the UL Rx point using an uplink transmit power associated with the received indication of the set of path loss values and the received indication of the one of the set of path loss values. For example, the apparatus may determine an uplink transmit power that is appropriate to ensure uplink reception in view of (or otherwise based on) the path loss value within the set of path loss values that corresponds to the received indication of the one of the set of path loss values. Means for performing functions of the operations in block 514 may include the processor (such as 210, 212, 214, 216, 218, 252, 260, 424).

The apparatus may continuously or periodically repeat the operations 500e.

Figure 5F:
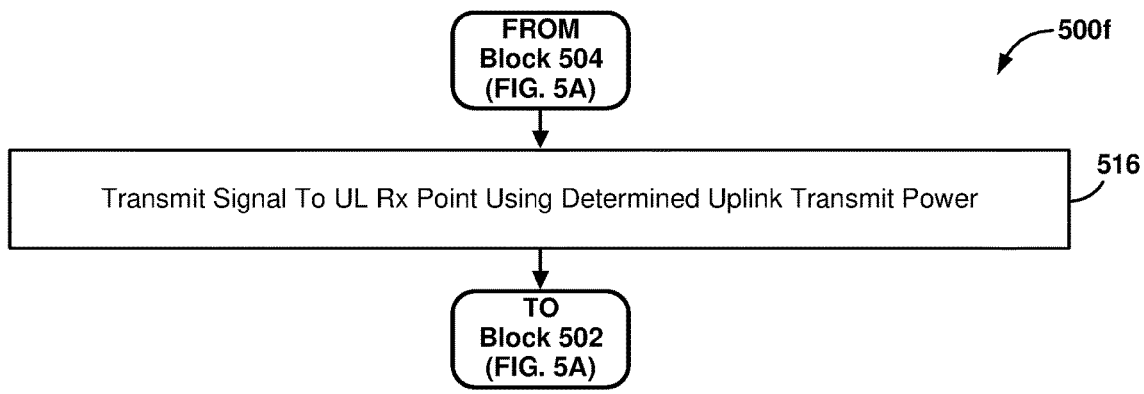

Referring to FIG. 5F, following the operations of block 504 (FIG. 5A), the apparatus may transmit a signal to the UL Rx point using the determined uplink transmit power associated with or determined based upon a received path loss value, such as one or more of a PUSCH path loss value, a PUCCH path loss value, or a PUCCH path loss value received from a base station in block 516. Means for performing functions of the operations in block 516 may include the processor (such as 210, 212, 214, 216, 218, 252, 260, 424) coupled to a wireless transceiver (such as the wireless transceiver 266).

The apparatus may then perform the operations of block 502 (FIG. 5A).

Figure 5G:
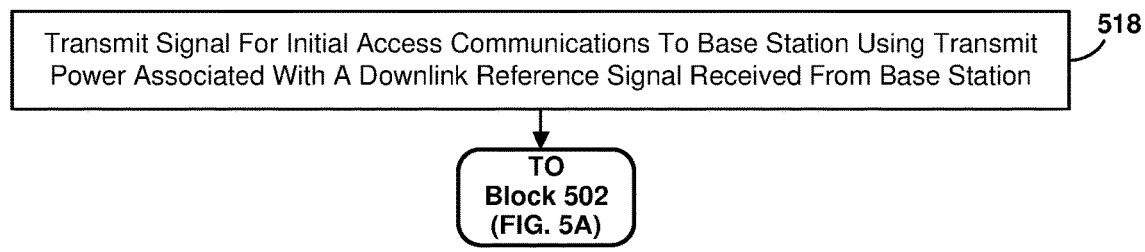

Referring to FIG. 5G, prior to performing the operations of block 502, the apparatus may transmit a signal for initial access communications to the base station using a transmit power associated with a downlink reference signal from the base station in block 518. For example, for random access channel (RACH) procedure transmissions, or for PUSCH transmissions scheduled by a random access response (RAR) uplink grant, the wireless device may not use a path loss value from the base station to determine an uplink transmit power. Rather, for initial access communications, the apparatus may determine an uplink transmit power using information in or signal strength of another signal received from the base station, such as a downlink reference signal (RS) associated with a physical RACH (PRACH) transmission from the base station.

The apparatus may then perform the operations of block 502 (FIG. 5A).

Figure 6A:
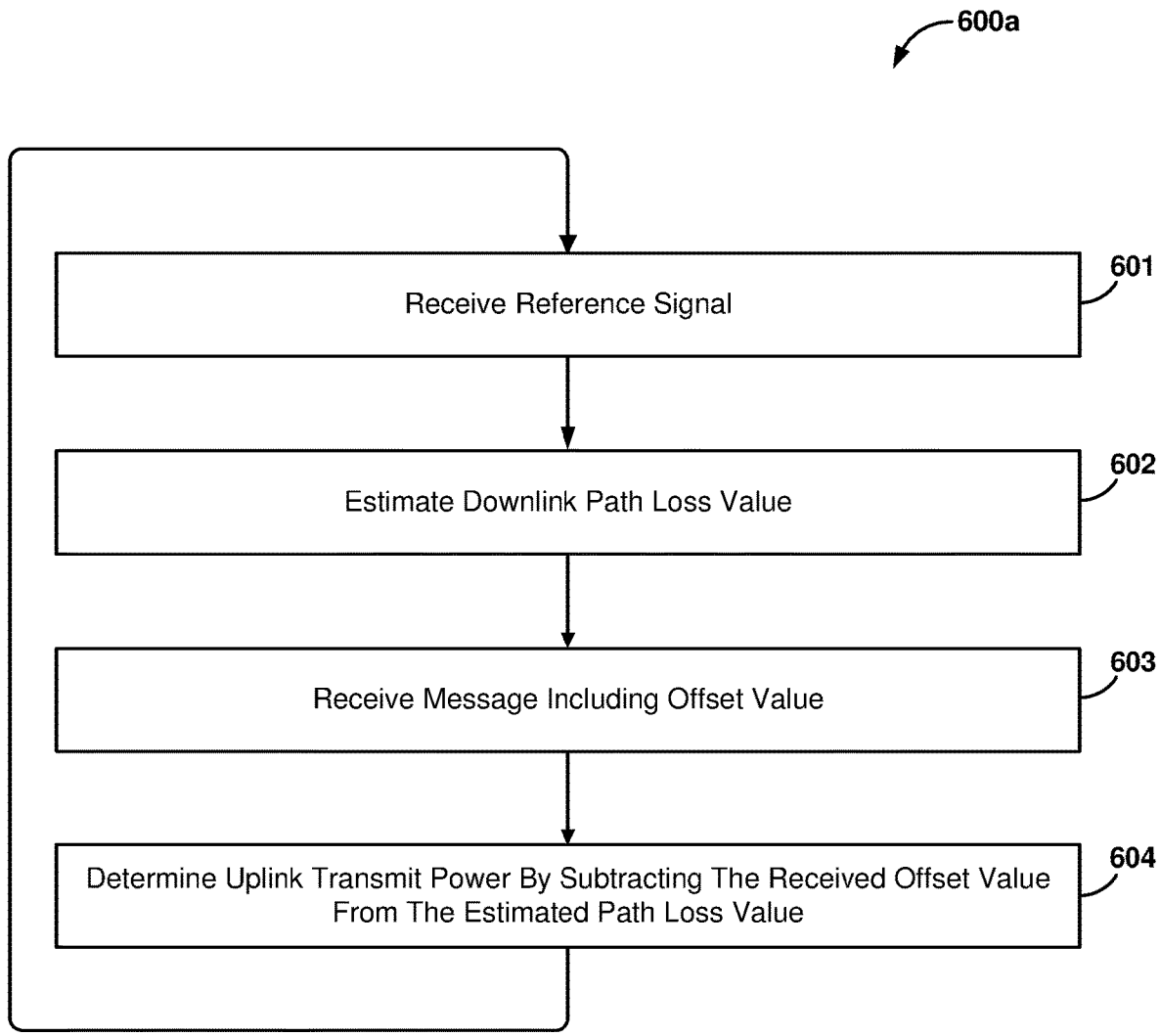
FIG. 6A shows a process flow diagram of an example method for managing transmit power control.

FIG. 6A shows a process flow diagram of an example method 600a for managing transmit power control, including selecting the transmit power for signals transmitted to an UL Rx point in response to or after receiving various reference signals from a base station. With reference to FIGS. 1-6A, the operations of the method 600a may be performed by an apparatus (such as a processing system) (such as 210, 212, 214, 216, 218, 252, 260, 424) of a wireless device (such as the wireless device 120a-120e, 200, 320, 402).

In block 601, the apparatus may receive a reference signal (such as from a base station). Means for performing functions of the operations in block 601 may include a processor (such as 210, 212, 214, 216, 218, 252, 260, 424) coupled to a wireless transceiver (such as the wireless transceiver 266).

In block 602, the apparatus may estimate a downlink path loss value, such as by comparing the signal strength of the received reference signal to a known value of the strength reference signal as transmitted to estimate a signal strength difference. In some implementations, the apparatus may determine a downlink path loss value. Means for performing functions of the operations in block 602 may include a processor (such as 210, 212, 214, 216, 218, 252, 260, 424).

In block 603, the apparatus may receive a message from the base station including an offset value, which may be a value that the apparatus can add to or subtract from a reference power level to select or otherwise determine the appropriate uplink power level. In some implementations, the apparatus may receive from a base station a message that includes an offset value, which may be a value in terms of decibels (dB). The wireless device may be directly indicated in the message along with the offset value. Thus, in such an implementation the offset value may not be conveyed through transmission of the DL RS with the wireless device measuring the DL RS. The wireless device may be provided with a DL RS and the offset value may be applied by the wireless device to the received DL RS to determine the adjustment to be made to the uplink transmit power. In some implementations, the apparatus may receive a downlink reference signal from the base station that includes path loss information. In some implementations, the downlink reference signal may include the offset value. Means for performing functions of the operations in block 603 may include a processor (such as 210, 212, 214, 216, 218, 252, 260, 424) coupled to a wireless transceiver (such as the wireless transceiver 266).

In block 604, the apparatus may determine an uplink transmit power by subtracting the received offset value from the estimated downlink path loss value. For example, the apparatus may adjust an uplink transmit power of a signal to be transmitted to the UL Rx point based on the offset value received from the base station. In some implementations, in block 604 the wireless device apparatus may measure the DL RS received from the base station to determine a reference path loss value "PL0." The apparatus may then add or subtract the offset value received from the base station in block 602 (referred to as a path loss offset or "PLoffset") from the reference path loss value PL0 to determine the correct power level for the uplink to the current UL Rx point. In equation form, this may be expressed as Tx Power=PL0−PLoffset. Means for performing functions of the operations in block 604 may include the processor (such as 210, 212, 214, 216, 218, 252, 260, 424).

The method 600a may be repeated continuously or periodically as the apparatus may again perform the operations of block 602.

FIGS. 6B-6G show process flow diagrams of example operations 600b-600g that may be performed as part of the method for managing transmit power control. With reference to FIGS. 1-6G, the operations 600b-600g may be performed by an apparatus (such as a processing system) (such as 210, 212, 214, 216, 218, 252, 260, 424) of a wireless device (such as the wireless device 120a-120e, 200, 320, 404).

Figure 6B:
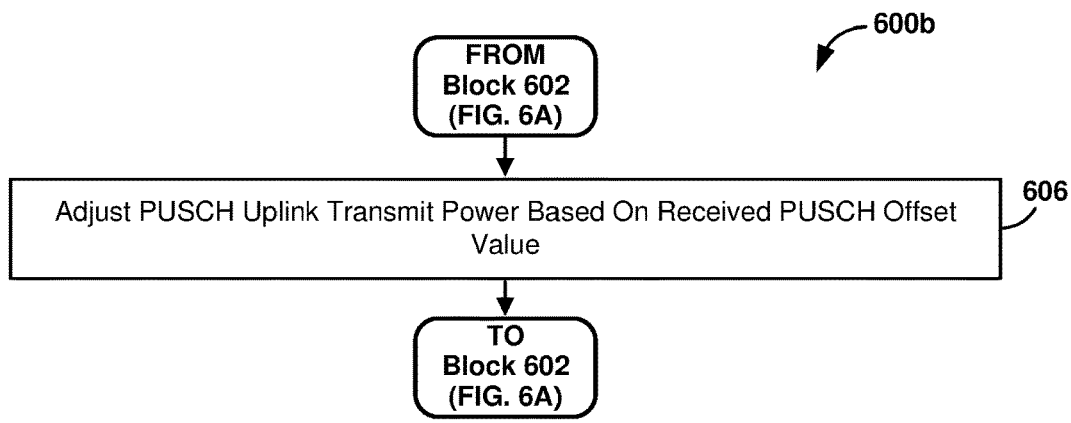
FIGS. 6B-6G show process flow diagrams of example operations that may be performed as part of the method for managing transmit power control.

Referring to FIG. 6B, following the operations of block 602 (FIG. 6A), the apparatus may adjust a PUSCH uplink transmit power based on a received PUSCH offset value in block 606. For example, in some implementations, the offset value received from the base station may include a PUSCH offset value. In such implementations, the apparatus may adjust a PUSCH uplink transmit power for a signal to be transmitted to the UL Rx point based on the received PUSCH offset value. Means for performing functions of the operations in block 606 may include the processor (such as 210, 212, 214, 216, 218, 252, 260, 424) coupled to a wireless transceiver (such as the wireless transceiver 266).

The apparatus may perform the operations of block 602 (FIG. 6A).

Figure 6C:
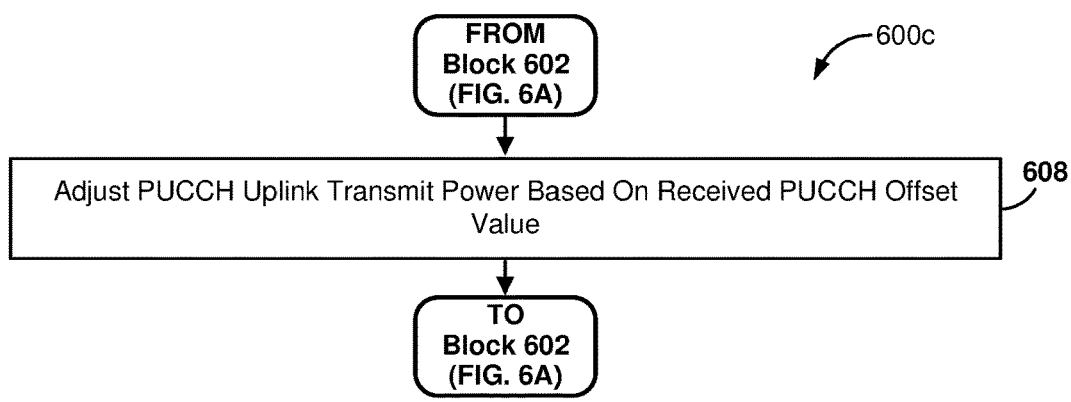

Referring to FIG. 6C, following the operations of block 602 (FIG. 6A), the apparatus may adjust a physical uplink control channel (PUCCH) uplink transmit power based on a received PUCCH offset value in block 608. For example, in some implementations, the offset value received from the base station may include a PUCCH offset value. In such implementations, the apparatus may adjust a PUCCH uplink transmit power for a signal to be transmitted to the UL Rx point based on the received PUCCH offset value. Means for performing functions of the operations in block 608 may include the processor (such as 210, 212, 214, 216, 218, 252, 260, 424) coupled to a wireless transceiver (such as the wireless transceiver 266).

The apparatus may perform the operations of block 602 (FIG. 6A).

Figure 6D:
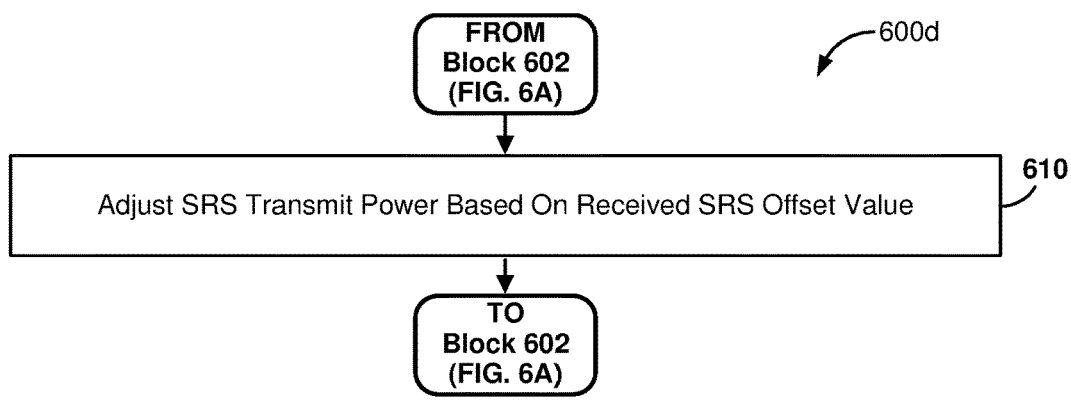

Referring to FIG. 6D, following the operations of block 602 (FIG. 6A), the apparatus may adjust a sounding reference signal (SRS) uplink transmit power based on a received sounding reference signal (SRS) offset value in block 610. For example, in some implementations, the offset value received from the base station may include an SRS offset value. In such implementations, the apparatus may adjust an SRS uplink transmit power for a signal to be transmitted to the UL Rx point based on the received SRS offset value. Means for performing functions of the operations in block 610 may include the processor (such as 210, 212, 214, 216, 218, 252, 260, 424) coupled to a wireless transceiver (such as the wireless transceiver 266).

The apparatus may perform the operations of block 602 (FIG. 6A).

Figure 6E:
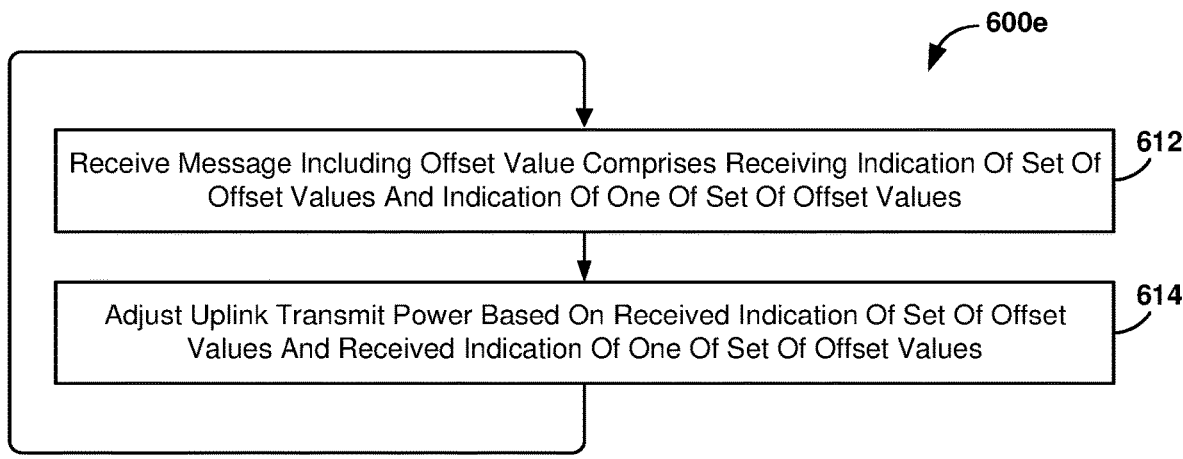

Referring to FIG. 6E, the apparatus may receive an indication of a set of offset values and an indication of one of the set of offset values in block 612. In some implementations, rather than a single offset value, the apparatus may receive a message (for example, from a base station) that includes an indication (such as an index) of a set of offset values. In some implementations, one or more sets of offset values may be stored in a memory of the wireless device, and each set of offset values may be associated with an index value. In some implementations, the message also may indicate which offset value from among the set of offset values that the wireless device may use. Means for performing functions of the operations in block 612 may include the processor (such as 210, 212, 214, 216, 218, 252, 260, 424) coupled to a wireless transceiver (such as the wireless transceiver 266).

In some implementations, the apparatus may receive the indication of the set of offset values via one of radio resource control (RRC) signaling or a medium access control (MAC)-control element (CE) message. In some implementations, for the PUSCH, the set may be configured through configured through RRC signaling or the MAC-CE message. In some implementations, for the PUCCH, or for the SRS, the set may be configured through RRC signaling.

In some implementations, the indication of the one of the set of offset values may include an indication of a PUSCH offset value via a sounding reference signal resource indicator (SRI) field in a downlink control information (DCI) message. In some implementations, the indication of the one of the set of offset values may include an indication of a PUCCH offset value via a MAC-CE message. In some implementations, the indication of the one of the set of offset values may include an indication of an SRS offset value via a MAC-CE message.

In block 614, the apparatus may adjust an uplink transmit power based on the received indication of the set of offset values and the received indication of the one of the set of offset values. Means for performing functions of the operations in block 614 may include the processor (such as 210, 212, 214, 216, 218, 252, 260, 424).

The apparatus may continuously or periodically repeat the operations 600e.

Figure 6F:
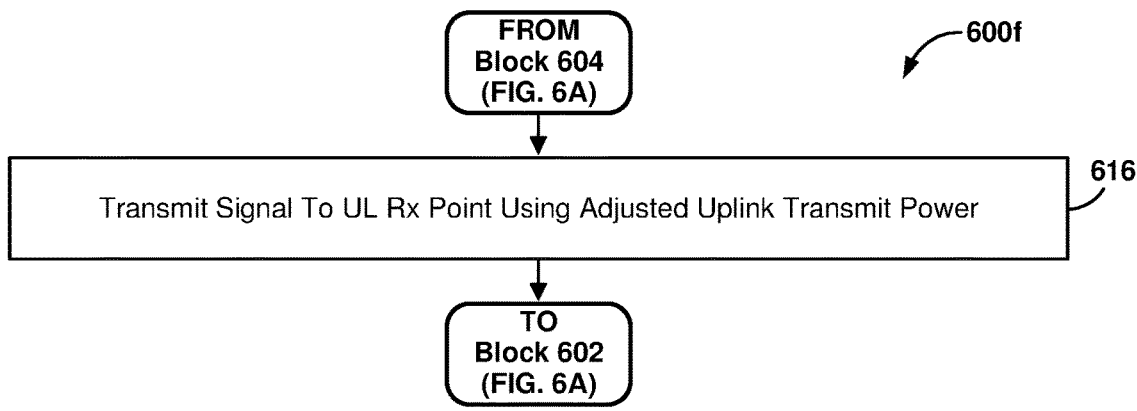

Referring to FIG. 6F, following the operations of block 604 (FIG. 6A), the apparatus may transmit a signal to the UL Rx point using the determined uplink transmit power in block 616. Means for performing functions of the operations in block 616 may include the processor (such as 210, 212, 214, 216, 218, 252, 260, 424) coupled to a wireless transceiver (such as the wireless transceiver 266).

The apparatus may then perform the operations of block 602 (FIG. 6A).

Figure 6G:
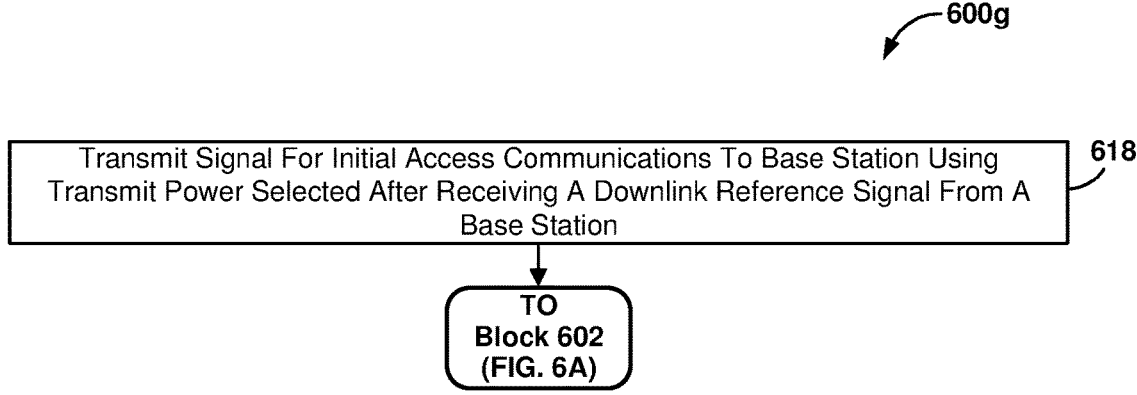

Referring to FIG. 6G, prior to performing the operations of block 602, the apparatus may transmit a signal for initial access communications to the base station using a transmit power selected after receiving a downlink reference signal from the base station in block 618. For example, for random access channel (RACH) procedure transmissions, or for PUSCH transmissions scheduled by a random access response (RAR) uplink grant, the wireless device may not use an offset value from the base station to determine an uplink transmit power. Rather, for initial access communications, the apparatus may determine an uplink transmit power using information in or signal strength of another signal received from the base station, such as a downlink reference signal (RS) associated with a physical RACH (PRACH) transmission from the base station.

The apparatus may then perform the operations of block 602 (FIG. 6A).

Figure 7A:
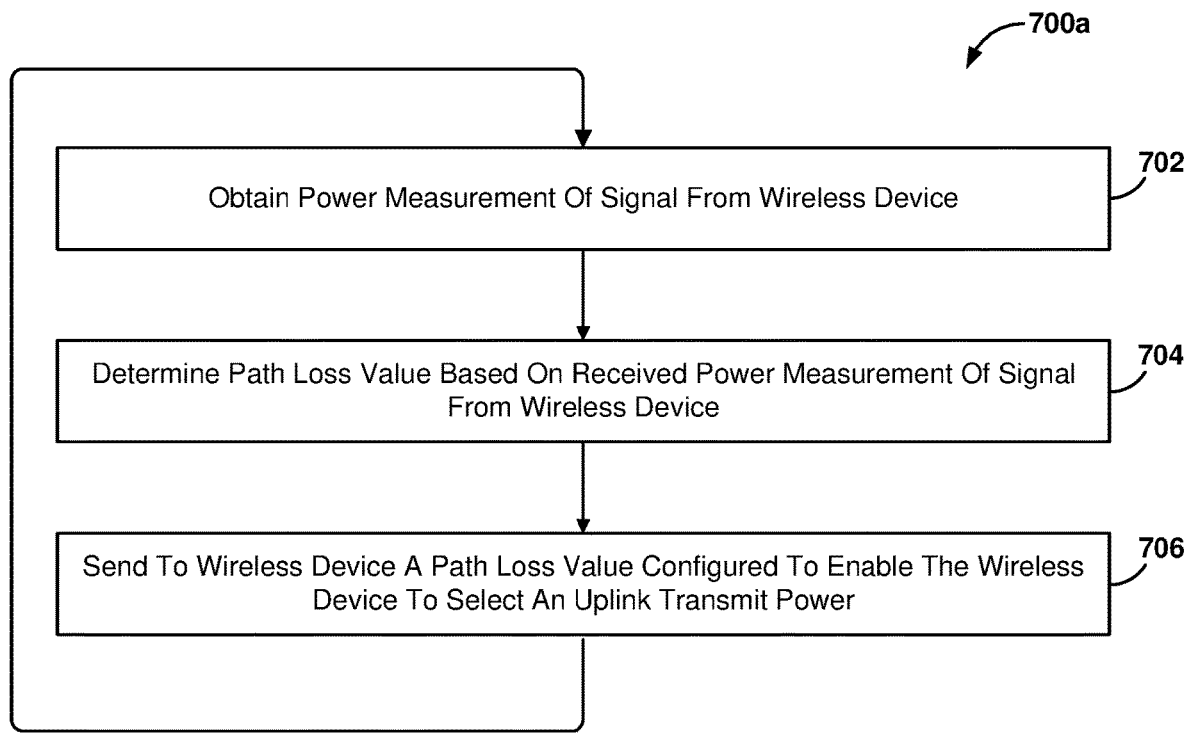
FIG. 7A shows a process flow diagram of an example method for managing transmit power of a wireless device.

FIG. 7A shows a process flow diagram of an example method 700a for managing transmit power by a base station based on measurements of a signal strength of signals received from a wireless device. With reference to FIGS. 1-7A, the operations of the method 600a may be performed by an apparatus (such as a processing system) (such as 210, 212, 214, 216, 218, 252, 260, 428) of a base station (such as the base station 110a, 350, 405).

In block 702, the apparatus may obtain a power measurement of a signal from a wireless device. For example, the apparatus may receive from an UL Rx point a power measurement made by the UL Rx point of a signal received from a wireless device. The apparatus of the base station may receive the power measurement from the UL Rx point via a backhaul communication link between the UL Rx point and the base station, which may include a wired or wireless communication link. Means for performing functions of the operations in block 702 may include the processor (such as 210, 212, 214, 216, 218, 252, 260, 428) coupled to a wireless transceiver (such as the wireless transceiver 266)

In block 704, the apparatus may determine a path loss value based on the received power measurement of the signal from the wireless device. In some implementations, the path loss value may include a physical uplink shared channel (PUSCH) path loss value. In some implementations, the path loss value may include a physical uplink control channel (PUCCH) path loss value. In some implementations, the path loss value may include a sounding reference signal (SRS) path loss value. In some implementations, the path loss value may include an indication of a set of path loss values and an indication of one of the set of path loss values. Means for performing functions of the operations in block 704 may include the processor (such as 210, 212, 214, 216, 218, 252, 260, 428).

In block 706, the apparatus may send to the wireless device the path loss value configured to enable the wireless device to select an uplink transmit power. For example, the apparatus may send to the wireless device the path loss value in a format that the wireless device can use to calculate or otherwise to determine an uplink transmit power of a signal for transmission to the UL Rx point. Means for performing functions of the operations in block 706 may include the processor (such as 210, 212, 214, 216, 218, 252, 260, 428) coupled to a wireless transceiver (such as the wireless transceiver 266)

The method 700a may be repeated continuously or periodically as the apparatus may again perform the operations of block 702.

FIGS. 7B-7E show process flow diagrams of example operations 700b-700e that may be performed as part of the method for managing transmit power of a wireless device. With reference to FIGS. 1-7E, the operations 700b-700e may be performed by an apparatus (such as a processing system) (such as 210, 212, 214, 216, 218, 252, 260, 428) of a base station (such as the base station 110a, 350, 405).

Figure 7B:
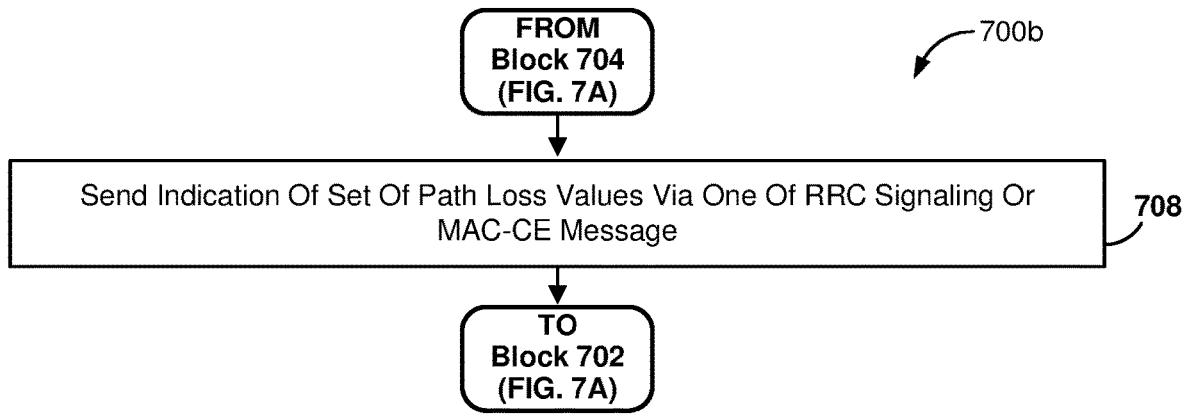
FIGS. 7B-7E show process flow diagrams of example operations that may be performed as part of the method for managing transmit power of a wireless device.

Referring to FIG. 7B, following the operations of block 704 (FIG. 7A), the apparatus may send an indication of the set of path loss values via one of radio resource control (RRC) signaling or a medium access control (MAC)-control element (CE) message in block 708. In some implementations, rather than sending a path loss value, the apparatus may send an indication of a set of path loss values. The set of path loss values may be stored in a memory of the wireless device, and may be associated with an index value or another suitable indicator. The apparatus also may send an indication of one of the set of path loss values, to indicate to the wireless device which path loss value from among the set of path loss values to use.

Means for performing functions of the operations in block 708 may include the processor (such as 210, 212, 214, 216, 218, 252, 260, 428) coupled to a wireless transceiver (such as the wireless transceiver 266).

The apparatus may then perform the operations of block 702 (FIG. 7A).

Figure 7C:
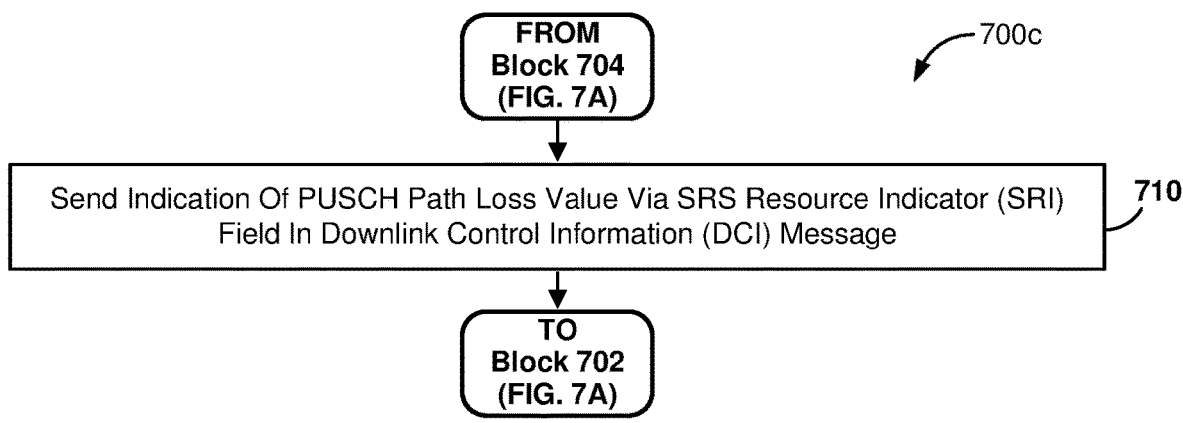

Referring to FIG. 7C, following the operations of block 704 (FIG. 7A), the apparatus may send an indication of a PUSCH path loss value via a sounding reference signal resource indicator (SRI) field in a downlink control information (DCI) message in block 710. Means for performing functions of the operations in block 710 may include the processor (such as 210, 212, 214, 216, 218, 252, 260, 428) coupled to a wireless transceiver (such as the wireless transceiver 266).

The apparatus may then perform the operations of block 702 (FIG. 7A).

Figure 7D:
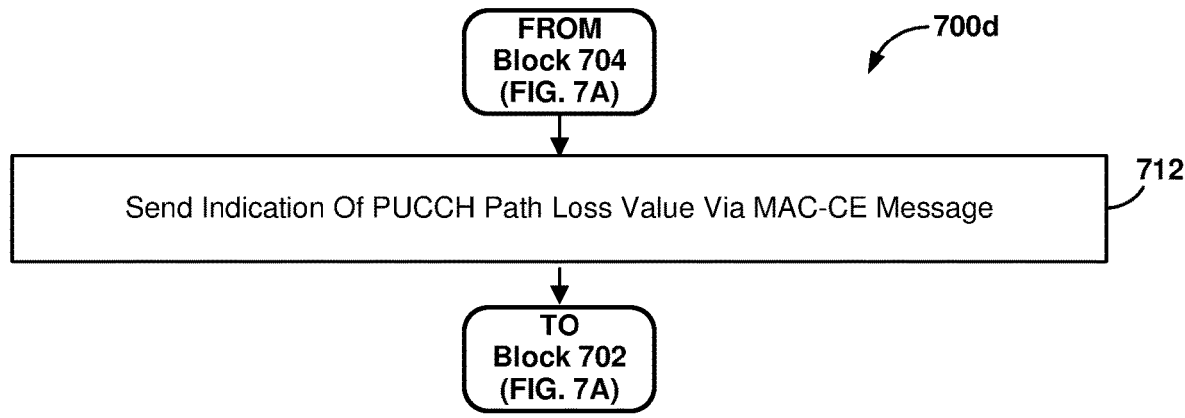

Referring to FIG. 7D, following the operations of block 704 (FIG. 7A), the apparatus may send an indication of a PUCCH path loss value via a MAC-CE message in block 712. Means for performing functions of the operations in block 712 may include the processor (such as 210, 212, 214, 216, 218, 252, 260, 428) coupled to a wireless transceiver (such as the wireless transceiver 266).

The apparatus may then perform the operations of block 702 (FIG. 7A).

Figure 7E:
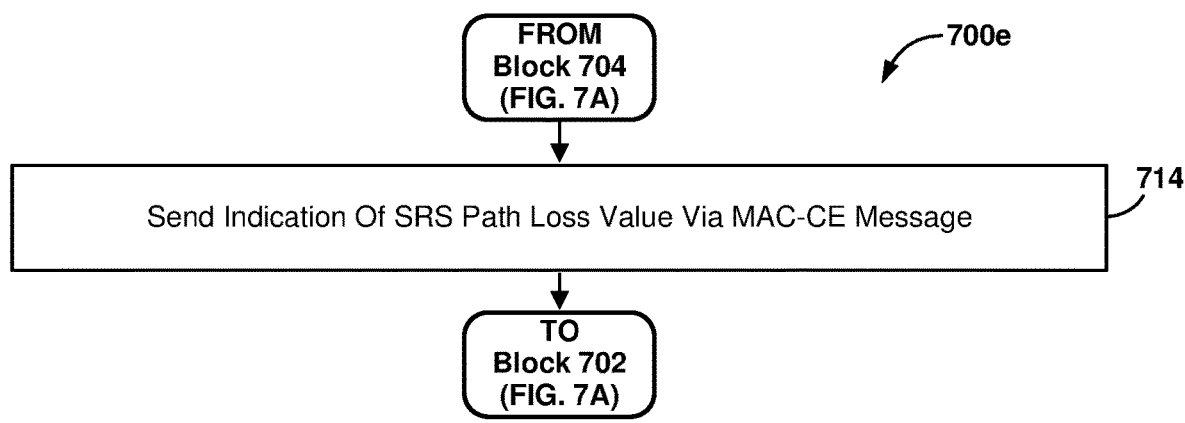

Referring to FIG. 7E, following the operations of block 704 (FIG. 7A), the apparatus may send an indication of an SRS path loss value via a MAC-CE message in block 714. Means for performing functions of the operations in block 714 may include the processor (such as 210, 212, 214, 216, 218, 252, 260, 428) coupled to a wireless transceiver (such as the wireless transceiver 266).

The apparatus may then perform the operations of block 702 (FIG. 7A).

Figure 8A:
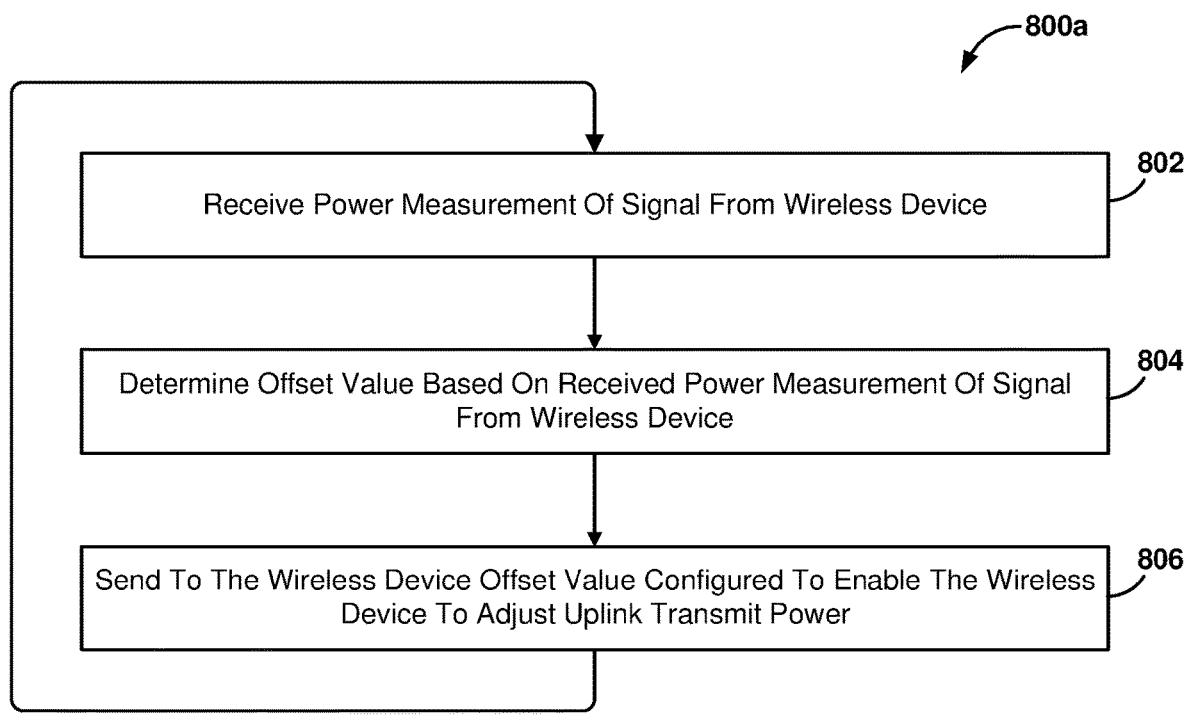
FIG. 8A shows a process flow diagram of an example method for managing transmit power of a wireless device.

FIG. 8A shows a process flow diagram of an example method 800a for managing transmit power of a wireless device based on power measurements of certain signal made by the wireless device. With reference to FIGS. 1-8A, the operations of the method 600a may be performed by an apparatus (such as a processing system) (such as 210, 212, 214, 216, 218, 252, 260, 428) of a base station (such as the base station 110a, 350, 405).

In block 802, the apparatus may receive a power measurement of a signal from a wireless device. For example, the apparatus may receive from an UL Rx point a power measurement performed by the wireless device of a signal received from the base station and reported to the UL Rx point. The report of the power measurement from the wireless device may be reported by the UL Rx point to the base station via a backhaul communication link between the UL Rx point and the base station, which may include a wired or wireless communication link. Means for performing functions of the operations in block 802 may include the processor (such as 210, 212, 214, 216, 218, 252, 260, 428) coupled to a wireless transceiver (such as the wireless transceiver 266)

In block 804, the apparatus may determine an offset value in view of (or otherwise based) on the received power measurement of the signal from the wireless device. In some implementations, the offset value may include a PUSCH offset value. In some implementations, the offset value may include a PUCCH offset value. In some implementations, the offset value may include an SRS offset value. In some implementations, the offset value may include an indication of a set of offset values and an indication of one of the set of offset values. Means for performing functions of the operations in block 804 may include the processor (such as 210, 212, 214, 216, 218, 252, 260, 428).

In block 806, the apparatus may send to the wireless device the offset value that is configured to enable the wireless device to select an uplink transmit power. For example, the apparatus may send to the wireless device the offset value in a data format that the wireless device can use to calculate or otherwise determine an uplink transmit power to use for signals transmitted to the UL Rx point. Means for performing functions of the operations in block 806 may include the processor (such as 210, 212, 214, 216, 218, 252, 260, 428) coupled to a wireless transceiver (such as the wireless transceiver 266)

The method 800*a* may be repeated continuously or periodically as the apparatus may again perform the operations of block 802.

FIGS. 8B-8E show process flow diagrams of example operations 800*b*-800*e* that may be performed as part of the method for managing transmit power of a wireless device. With reference to FIGS. 1-8E, the operations 800*b*-800*e* may be performed by an apparatus (such as a processing system) (such as 210, 212, 214, 216, 218, 252, 260, 428) of a base station (such as the base station 110*a*, 350, 405).

Figure 8B:
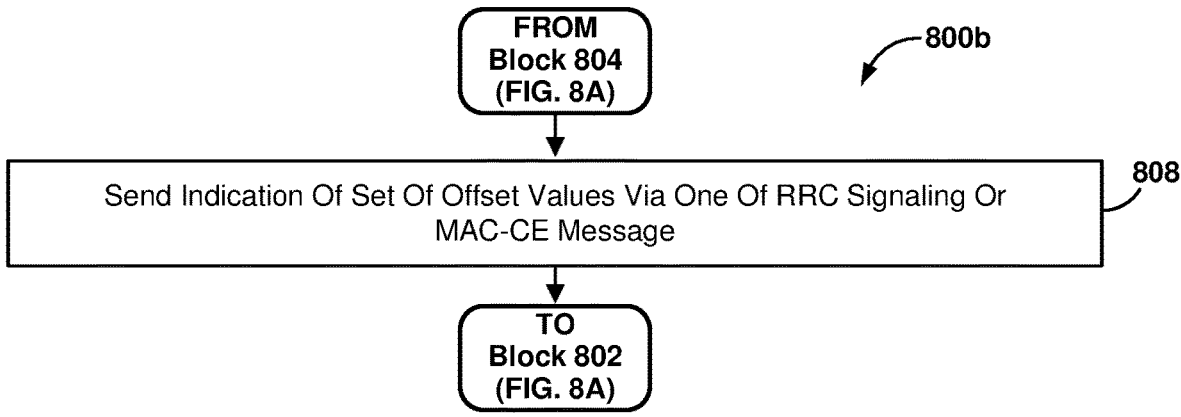
FIGS. 8B-8E show process flow diagrams of example operations that may be performed as part of the method for managing transmit power of a wireless device.

Referring to FIG. 8B, following the operations of block 804 (FIG. 8A), the apparatus may send an indication of the set of offset values via one of radio resource control (RRC) signaling or a medium access control (MAC)-control element (CE) message in block 808. In some implementations, rather than sending an offset value, the apparatus may send an indication of a set of offset values. The set of offset values may be stored in a memory of the wireless device, and may be associated with an index value or another suitable indicator. The apparatus also may send an indication of one of the set of offset values, to indicate to the wireless device which offset value from among the set of offset values to use. Means for performing functions of the operations in block 808 may include the processor (such as 210, 212, 214, 216, 218, 252, 260, 428) coupled to a wireless transceiver (such as the wireless transceiver 266).

The apparatus may then perform the operations of block 802 (FIG. 8A).

Figure 8C:
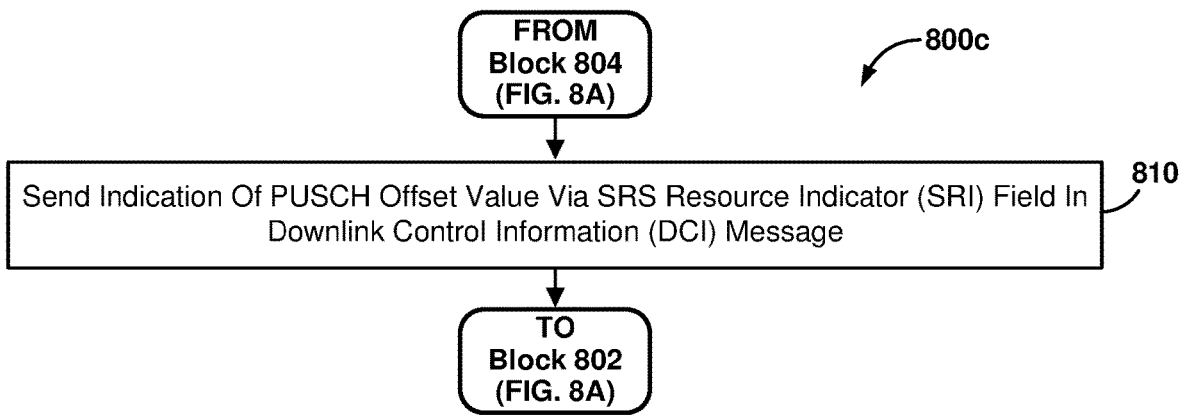

Referring to FIG. 8C, following the operations of block 804 (FIG. 8A), the apparatus may send an indication of a PUSCH offset value via a sounding reference signal resource indicator (SRI) field in a downlink control information (DCI) message in block 810. Means for performing functions of the operations in block 810 may include the processor (such as 210, 212, 214, 216, 218, 252, 260, 428) coupled to a wireless transceiver (such as the wireless transceiver 266).

The apparatus may then perform the operations of block 802 (FIG. 8A).

Figure 8D:
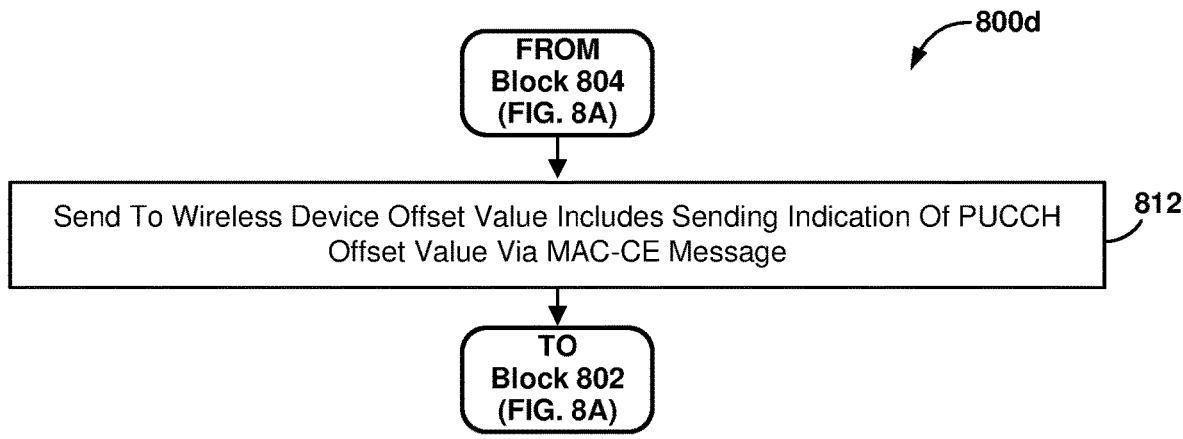

Referring to FIG. 8D, following the operations of block 804 (FIG. 8A), the apparatus may send an indication of a PUCCH offset value via a MAC-CE message in block 812. Means for performing functions of the operations in block 812 may include the processor (such as 210, 212, 214, 216, 218, 252, 260, 428) coupled to a wireless transceiver (such as the wireless transceiver 266).

The apparatus may then perform the operations of block 802 (FIG. 8A).

Figure 8E:
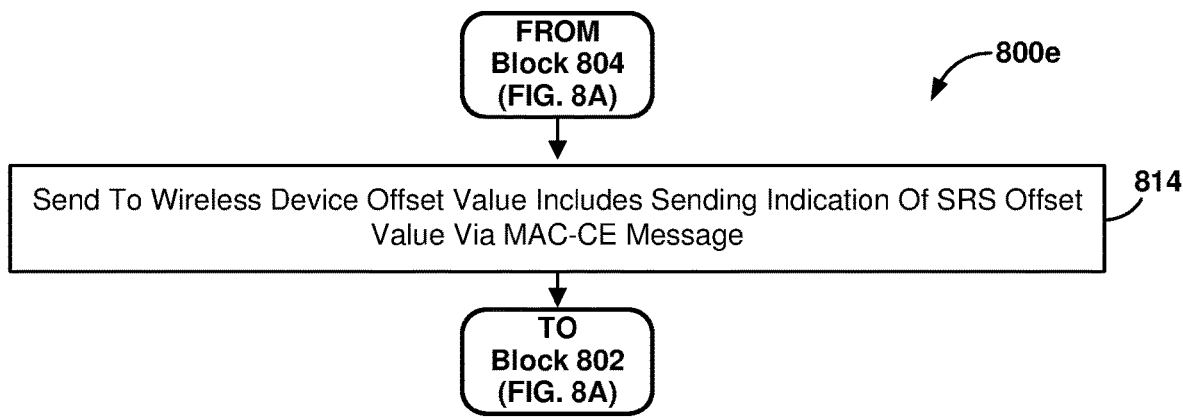

Referring to FIG. 8E, following the operations of block 804 (FIG. 8A), the apparatus may send an indication of an SRS offset value via a MAC-CE message in block 814. Means for performing functions of the operations in block 814 may include the processor (such as 210, 212, 214, 216, 218, 252, 260, 428) coupled to a wireless transceiver (such as the wireless transceiver 266).

The apparatus may then perform the operations of block 802 (FIG. 8A).

Figure 9:
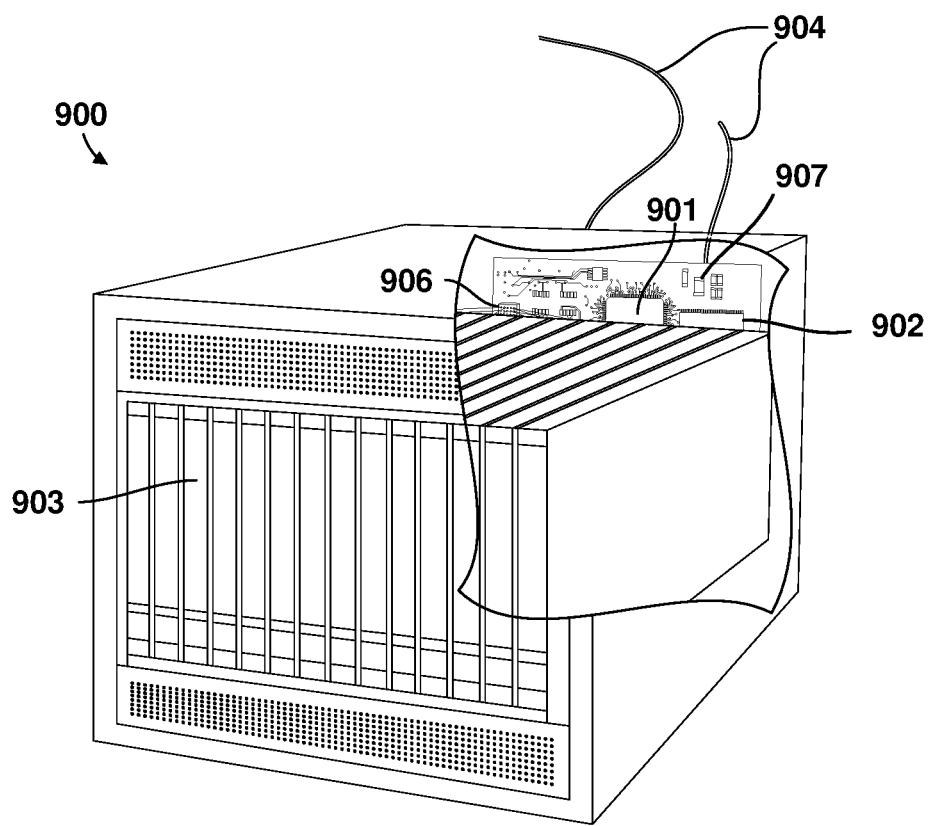
FIG. 9 shows a component block diagram of an example network computing device.

FIG. 9 shows a component block diagram of an example of a network computing device 900. With reference to FIGS. 1-9, the network computing device 900 may function as a network element of a communication network, such as a base station (for example, the base station 110*a*, 110*b*, 350). The network computing device 900 may include an apparatus (such as a processing system) 901 coupled to volatile memory 902 and a large capacity nonvolatile memory, such as a disk drive 903. The network computing device 900 also may include a peripheral memory access device such as a floppy disc drive, compact disc (CD) or digital video disc (DVD) drive 906 coupled to the apparatus 901. The network computing device 900 also may include network access ports 904 (or interfaces) coupled to the apparatus 901 for establishing data connections with a network, such as the Internet or a local area network coupled to other system computers and servers. The network computing device 900 may include one or more antennas 907 for sending and receiving electromagnetic radiation that may be connected to a wireless communication link. The network computing device 900 may include additional access ports, such as USB, Firewire, Thunderbolt, and the like for coupling to peripherals, external memory, or other devices.

Figure 10:
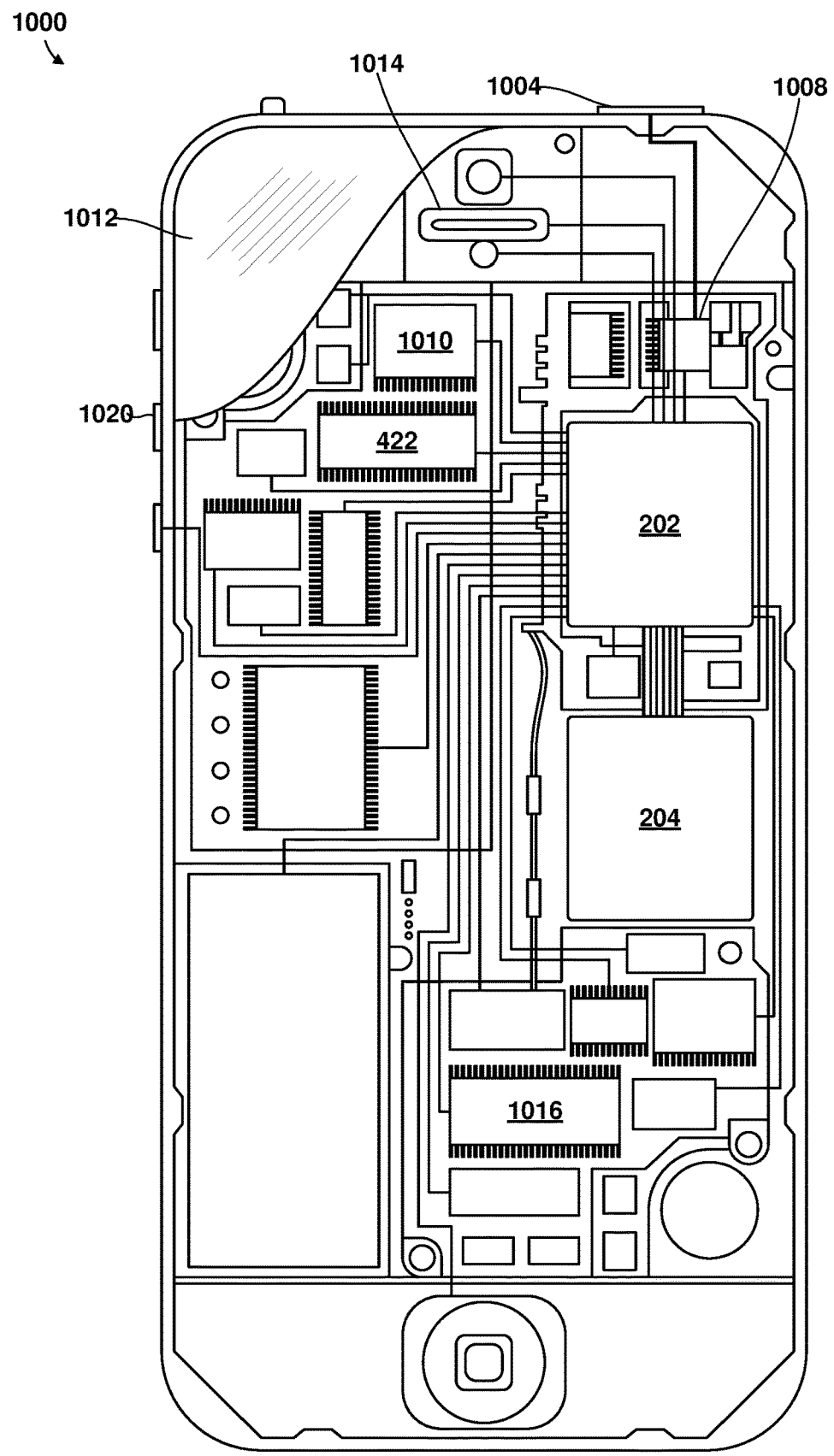
FIG. 10 shows a component block diagram of an example wireless device.

FIG. 10 shows a component block diagram of an example wireless device 1000. With reference to FIGS. 1-10, the wireless device 1000 (such as the wireless device 120*a*-120*e*, 200, 320, 404) may be a device suitable for implementing various implementations, such as a mobile device. The wireless device 1000 may include a first SOC 202 (such as a SOC-CPU) coupled to a second SOC 204 (such as a 5G capable SOC). The first and second SOCs 202, 204 may be coupled to internal memory 422, 1016, a display 1012, and to a speaker 1014. Additionally, the wireless device 1000 may include an antenna 1004 for sending and receiving electromagnetic radiation that may be connected to a wireless data link or cellular telephone transceiver 1008 coupled to one or more processing systems in the first or second SOCs 202, 204. The wireless device 1000 may include menu selection buttons or rocker switches 1020 for receiving user inputs.

The wireless device 1000 also may include a sound encoding/decoding (CODEC) circuit 1010, which digitizes sound received from a microphone into data packets suitable for wireless transmission and decodes received sound data packets to generate analog signals that are provided to the speaker 1014 to generate sound. One or more of the processing systems in the first and second SOCs 202, 204, wireless transceiver 1008 and CODEC 1010 may include a digital signal processor (DSP) circuit (not shown separately).

The processing systems of the network computing device 900 and the wireless device 1000 may be any programmable microprocessor, microcomputer or multiple processor chip or chips that can be configured by processor-executable instructions to perform a variety of functions, including the functions of the various implementations described herein. In some mobile devices, multiple processing systems may be provided, such as one processing system within an SOC 204 dedicated to wireless communication functions and one processing system within an SOC 202 dedicated to running other applications. Software applications may be stored in the memory 422, 426, 902, 1016 before they are accessed and loaded into the processing system. The processing systems may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods disclosed herein may be substituted for or combined with one or more operations of the methods disclosed herein.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods 500a-500g, 600a-600g, and 700a-700e may be substituted for or combined with one or more operations of the methods 500a-500g, 600a-600g, and 700a-700e.

Implementation examples are described in the following paragraphs. While some of the following implementation examples are described in terms of example methods, further example implementations may include: the example methods discussed in the following paragraphs implemented by a wireless device or base station including an apparatus with a processing system configured with processor-executable instructions to perform operations of the methods of the following implementation examples; the example methods discussed in the following paragraphs implemented by a wireless device or base station including means for performing functions of the methods of the following implementation examples; and the example methods discussed in the following paragraphs may be implemented as a non-transitory processor-readable storage medium having stored thereon processor-executable instructions configured to cause a processor of a wireless device or base station to perform the operations of the methods of the following implementation examples.

Example 1. A method for managing transmit power control, including: receiving from a base station a message including a path loss value; and transmitting a signal to an uplink (UL) receive (Rx) point using an uplink transmit power associated with the received path loss value.

Example 2. The method of example 1, in which the path loss value includes PUSCH path loss value; and transmitting the signal to the UL Rx point includes transmitting the signal to the UL Rx point using a PUSCH uplink transmit power associated with the PUSCH path loss value.

Example 3. The method of any of examples 1 or 2, in which: the path loss value includes PUCCH path loss value; and transmitting the signal to the UL Rx point includes transmitting the signal to the UL Rx point using a PUCCH uplink transmit power associated with the PUCCH path loss value.

Example 4. The method of any of examples 1-3, in which: the path loss value includes SRS path loss value; and transmitting the signal to the UL Rx point includes transmitting the signal to the UL Rx point using an SRS transmit power associated with the received SRS path loss value.

Example 5. The method of any of examples 1-4, in which: receiving a message including a path loss value includes receiving an indication of a set of path loss values and an indication of one of the set of path loss values; and transmitting the signal to the UL Rx point includes transmitting the signal to the UL Rx point using an uplink transmit power associated with the received indication of the set of path loss values and the received indication of the one of the set of path loss values.

Example 6. The method of example 5, in which the indication of the set of path loss values is received via one of RRC signaling or a MAC-CE message.

Example 7. The method of example 5, in which the indication of the one of the set of path loss values includes an indication of a PUSCH path loss value via an SRI field in a DCI message.

Example 8. The method of example 5, in which the indication of the one of the set of path loss values includes an indication of a PUCCH path loss value via a MAC-CE message.

Example 9. The method of example 5, in which the indication of the one of the set of path loss values includes an indication of an SRS path loss value via a MAC-CE message.

Example 10. The method of any of examples 1-9, further including determining the uplink transmit power using the received path loss value.

Example 11. The method of any of examples 1-10, further including: transmitting a signal for initial access communications to a base station using a transmit power based on a downlink reference signal from the base station.

Example 12. The method of any of examples 1-11, further including: sending a message indicating that the wireless device is capable of determining the uplink transmit power based on the received path loss value.

Example 13. The method of any of examples 1-12, in which receiving from the base station the message including a path loss value includes: sending a signal to enable a path loss measurement; and receiving from the base station the message including the path loss value in response to the signal.

Example 14. A method for managing transmit power control, including: receiving a reference signal; receiving a message including an offset value; and transmitting a signal to an uplink (UL) receive (Rx) point using an uplink transmit power that includes.

Example 15. The method of example 14, in which: the offset value includes PUSCH offset value; and transmitting the signal to the UL Rx point includes transmitting the signal to the UL Rx point using a PUSCH uplink transmit power that includes the downlink path loss value minus the PUSCH offset value.

Example 16. The method of any of examples 14 or 15, in which: the offset value includes PUCCH offset value; and transmitting the signal to the UL Rx point includes transmitting the signal to the UL Rx point using a PUCCH uplink transmit power that includes the downlink path loss value minus the PUCCH offset value.

Example 17. The method of any of examples 14-16, in which: the offset value includes SRS offset value; and transmitting the signal to the UL Rx point includes transmitting the signal to the UL Rx point using an SRS transmit power that includes the downlink path loss value minus the received SRS offset value.

Example 18. The method of any of examples 14-17, in which: receiving a message including an offset value includes receiving an indication of a set of offset values and an indication of one of the set of offset values; and transmitting the signal to the UL Rx point includes transmitting the signal to the UL Rx point using an uplink transmit power associated with the received indication of the set of offset values and the received indication of the one of the set of offset values.

Example 19. The method of example 18, in which the indication of the set of offset values is received via one of RRC signaling or a MAC-CE message.

Example 20. The method of example 18, in which the indication of the one of the set of offset values includes an indication of a PUSCH offset value via an SRI field in a DCI message.

Example 21. The method of example 18, in which the indication of the one of the set of offset values includes an indication of a PUCCH offset value via a MAC-CE message.

Example 22. The method of example 18, in which the indication of the one of the set of offset values includes an indication of an SRS offset value via a MAC-CE message.

Example 23. The method of any of examples 14-22, further including: determining the downlink path loss value associate with reference signal.

Example 24. The method of any of examples 14-23, further including: transmitting a signal for initial access communications to a base station using a transmit power associated with the signal from the base station.

Example 25. A method for managing transmit power of a wireless device, including: obtaining a power measurement of a signal from a wireless device; and sending to the wireless device a path loss value associated with the received power measurement configured to enable the wireless device to select an uplink transmit power.

Example 26. The method of example 25, further including determining the path loss value associated with the received power measurement of the signal from the wireless device.

Example 27. The method of any of examples 25 and 26, in which the path loss value includes a PUSCH path loss value.

Example 28. The method of any of examples 25-27, in which the path loss value includes a PUCCH path loss value.

Example 29. The method of any of examples 25-28, in which the path loss value includes a SRS path loss value.

Example 30. The method of any of examples 25-29, in which the path loss value includes an indication of a set of path loss values and an indication of one of the set of path loss values.

Example 31. The method of example 30, in which sending to the wireless device an indication of a set of path loss values includes sending the indication of the set of path loss values via one of RRC signaling or a MAC-CE message.

Example 32. The method of any of examples 25-31, in which sending to the wireless device the path loss value includes sending an indication of a PUSCH path loss value via an SRI field in a DCI message.

Example 33. The method of any of examples 25-32, in which sending to the wireless device the path loss value includes sending an indication of a PUCCH path loss value via a MAC-CE message.

Example 34. The method of any of examples 25-33, in which sending to the wireless device the path loss value includes sending an indication of an SRS path loss value via a MAC-CE message.

Example 35. A method for managing transmit power of a wireless device, including: receiving a power measurement of a signal from a wireless device; and sending to the wireless device an offset value associated with the received power measurement configured to enable the wireless device to adjust an uplink transmit power.

Example 36. The method of example 35, including determining the offset value using the received power measurement of the signal from the wireless device.

Example 37. The method of any of examples 35 and 36, in which the offset value includes PUSCH offset value.

Example 38. The method of any of examples 35-37, in which the offset value includes PUCCH offset value.

Example 39. The method of any of examples 35-38, in which the offset value includes SRS offset value.

Example 40. The method of any of examples 35-39, in which the offset value includes an indication of a set of offset values and an indication of one of the set of offset values.

Example 41. The method of example 40, in which sending to the wireless device the indication of the set of offset values includes sending the indication of the set of offset values via one of RRC signaling or a MAC-CE message.

Example 42. The method of any of examples 35-41, in which sending to the wireless device the offset value includes sending an indication of a PUSCH offset value via an SRI field in a DCI message.

Example 43. The method of any of examples 35-42, in which sending to the wireless device the offset value includes sending an indication of a PUCCH offset value via a MAC-CE message.

Example 44. The method of any of examples 35-43, in which sending to the wireless device the offset value includes sending an indication of an SRS offset value via a MAC-CE message.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative logics, logical blocks, modules, components, circuits, and algorithm operations described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented as hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by an apparatus of a wireless device for managing transmit power control, comprising:
receiving from a base station a message including a path loss value comprising a physical uplink control channel (PUCCH) path loss value or a sounding reference signal (SRS) path loss value; and transmitting a PUCCH or SRS signal to an uplink (UL) receive (Rx) point that is different from the base station using an adjusted uplink transmit power associated with the received respective PUCCH path loss value or SRS path loss value.

2. The method of claim 1, wherein:
receiving the message including the path loss value comprising the PUCCH path loss value or the SRS path loss value comprises receiving an indication of a set of PUCCH or SRS path loss values and an indication of one of the set of PUCCH or SRS path loss values; and
transmitting the PUCCH or SRS signal to the UL Rx point that is different from the base station comprises transmitting the PUCCH or SRS signal to the UL Rx point using an uplink transmit power associated with the received indication of the set of PUCCH or SRS path loss values and the received indication of the one of the set of PUCCH or SRS path loss values.

3. The method of claim 2, wherein the indication of the set of PUCCH or SRS path loss values is received via one of radio resource control (RRC) signaling or a medium access control (MAC)-control element (CE) message.

4. The method of claim 2, wherein the indication of the one of the set of PUCCH or SRS path loss values comprises one or more an indication of a PUCCH path loss value via a MAC-CE message or an indication of an SRS path loss value via a MAC-CE message.

5. The method of claim 1, further comprising determining the uplink transmit power for the PUCCH or SRS signal using the received respective PUCCH path loss value or SRS path loss value.

6. The method of claim 1, further comprising:
transmitting a signal for initial access communications to a base station using a transmit power associated with a downlink reference signal from the base station.

7. The method of claim 1, further comprising:
sending a message indicating that the wireless device is capable of determining the uplink transmit power associated with the received path loss value.

8. The method of claim 1, wherein receiving from the base station the message including the path loss value comprising the PUCCH path loss value or the SRS path loss value comprises:
sending a signal to enable a path loss measurement; and
receiving from the base station the message including the PUCCH path loss value or the SRS path loss value in response to the signal.

9. An apparatus of a wireless device, comprising:
one or more transceivers; and
one or more processing systems coupled to the one or more transceivers and individually or collectively configured to:
receive from a base station a message including a path loss value comprising a physical uplink control channel (PUCCH) path loss value or a sounding reference signal (SRS) path loss value; and
transmit a PUCCH or SRS signal to an uplink (UL) receive (Rx) point that is different from the base station using an uplink transmit power associated with the received respective PUCCH path loss value or the SRS path loss value.

10. The apparatus of claim 9, wherein the one or more processing systems are further individually or collectively configured to:

receive an indication of a set of PUCCH or SRS path loss values and an indication of one of the set of PUCCH or SRS path loss values; and
transmit the PUCCH or SRS signal to the UL Rx point that is different from the base station using an uplink transmit power associated with the received indication of the set of PUCCH or SRS path loss values and the received indication of the one of the set of PUCCH or SRS path loss values.

11. The apparatus of claim 10, wherein the one or more processing systems are further individually or collectively configured such that the indication of the set of PUCCH or SRS path loss values is received via one of radio resource control (RRC) signaling or a medium access control (MAC)-control element (CE) message.

12. The apparatus of claim 10, wherein the one or more processing systems are further individually or collectively configured such that the indication of the one of the set of path loss values comprises one or more of an indication of a PUCCH path loss value via a MAC-CE message or an indication of an SRS path loss value via a MAC-CE message.

13. The apparatus of claim 9, wherein the one or more processing systems are further individually or collectively configured to determine the uplink transmit power for the PUCCH or SRS signal using the received respective PUCCH path loss value or SRS path loss value.

14. The apparatus of claim 9, wherein the one or more processing systems are further individually or collectively configured to:
transmit a signal for initial access communications to a base station using a transmit power associated with a downlink reference signal from the base station.

15. The apparatus of claim 9, wherein the one or more processing systems are further individually or collectively configured to:
send a message indicating that the wireless device is capable of determining the uplink transmit power associated with the received path loss value.

16. The apparatus of claim 9, wherein the one or more processing systems are further individually or collectively configured to:
send a signal to enable a path loss measurement; and
receive from the base station the message including the PUCCH path loss value or the SRS path loss value in response to the signal.

17. A method performed by an apparatus of a base station for managing transmit power of a wireless device, comprising:
obtaining a power measurement of a signal from a wireless device; and
sending to the wireless device a path loss value comprising a physical uplink control channel (PUCCH) path loss value or a sounding reference signal (SRS) path loss value associated with the received power measurement configured to enable the wireless device to select an uplink transmit power of a PUCCH or SRS signal for transmission to an uplink (UL) receive (Rx) point that is different from the base station.

18. The method of claim 17, further comprising determining the path loss value comprising the PUCCH path loss value or the SRS path loss value associated with the received power measurement of the signal from the wireless device.

19. The method of claim 17, wherein the path loss value comprising the PUCCH path loss value or an SRS path loss value comprises an indication of a set of PUCCH or SRS path loss values and an indication of one of the set of PUCCH or SRS path loss values.

20. The method of claim 19, wherein sending to the wireless device an indication of a set of PUCCH or SRS path loss values comprises sending the indication of the set of PUCCH or SRS path loss values via one of radio resource control (RRC) signaling or a medium access control (MAC)-control element (CE) message.

21. The method of claim 17, wherein sending to the wireless device the path loss value comprising the PUCCH path loss value or the SRS path loss value comprises one of sending an indication of the PUCCH path loss value via a MAC-CE message or an indication of the SRS path loss value via a MAC-CE message.

22. An apparatus of a base station, comprising:
one or more transceivers; and
one or more processing systems coupled to the one or more transceivers and individually or collectively configured to:
 obtain a power measurement of a signal from a wireless device; and
 send to the wireless device a path loss value comprising a physical uplink control channel (PUCCH) path loss value or a sounding reference signal (SRS) path loss value associated with the received power measurement configured to enable the wireless device to select an uplink transmit power of a PUCCH or SRS signal for transmission to an uplink (UL) receive (Rx) point that is different from the base station.

23. The apparatus of claim 22, wherein the one or more processing systems are further individually or collectively configured to determine the path loss value comprising the PUCCH path loss value or the SRS path loss value associated with the received power measurement of the signal from the wireless device.

24. The apparatus of claim 22, wherein the one or more processing systems are further individually or collectively configured such that the path loss value comprising the PUCCH path loss value or the SRS path loss value comprises an indication of a set of PUCCH or SRS path loss values and an indication of one of the set of PUCCH or SRS path loss values.

25. The apparatus of claim 24, wherein the one or more processing systems are further individually or collectively configured to send the indication of the set of PUCCH or SRS path loss values via one of radio resource control (RRC) signaling or a medium access control (MAC)-control element (CE) message.

26. The apparatus of claim 22, wherein the one or more processing systems are further individually or collectively configured to send one of an indication of the PUCCH path loss value via a MAC-CE message or the indication of an SRS path loss value via a MAC-CE message.

* * * * *